US010647619B2

(12) United States Patent
Sevast'yanov et al.

(10) Patent No.: US 10,647,619 B2
(45) Date of Patent: May 12, 2020

(54) METHOD FOR COMPREHENSIVELY PROCESSING BROWN COAL AND LEONARDITE INTO HUMIC FERTILIZERS AND PREPARATIONS AND INTO FUEL BRIQUETTES, AND MECHANOCHEMICAL REACTOR FOR PROCESSING HIGHLY-VISCOUS MEDIA

(71) Applicants: Vladimir Petrovich Sevast'yanov, Novosibirsk (RU); Aleksej Ivanovich Petrov, Kiev (UA); Konstantin Nikolaevich Torop, Kiev (UA); Vitalij Nikolaevich Vary'gin, Novosibirsk (RU)

(72) Inventors: Vladimir Petrovich Sevast'yanov, Novosibirsk (RU); Aleksej Ivanovich Petrov, Kiev (UA); Lev Iosifovich Rabenko, Kiev (UA); Konstantin Nikolaevich Torop, Kiev (UA); Vitalij Nikolaevich Vary'gin, Novosibirsk (RU)

(73) Assignees: Vladimir Petrovich Sevast'yanov, Novosibirsk (RU); Aleksej Ivanovich Petrov, Kiev (UA); Konstantin Nikolaevich Torop, Kiev (UA); Vitalij Nikolaevich Vary'gin, Novosibirsk (RU)

( * ) Notice: Subject to any disclaimer, the term of this patent is extended or adjusted under 35 U.S.C. 154(b) by 0 days.

(21) Appl. No.: 15/305,448

(22) PCT Filed: Jul. 23, 2014

(86) PCT No.: PCT/RU2014/000544
§ 371 (c)(1),
(2) Date: Oct. 20, 2016

(87) PCT Pub. No.: WO2015/163785
PCT Pub. Date: Oct. 29, 2015

(65) Prior Publication Data
US 2017/0036967 A1    Feb. 9, 2017

(30) Foreign Application Priority Data
Apr. 23, 2014    (RU) .............................. 2014116670

(51) Int. Cl.
*C05F 11/02* (2006.01)
*B02C 13/22* (2006.01)
(Continued)

(52) U.S. Cl.
CPC .............. *C05F 11/02* (2013.01); *B01J 19/18* (2013.01); *B02C 13/22* (2013.01); *C05F 11/06* (2013.01);
(Continued)

(58) Field of Classification Search
CPC .......... C05F 11/02; C05F 11/06; B01J 19/18; C09K 17/42; C10L 5/361; C10L 2290/08;
(Continued)

(56) References Cited

U.S. PATENT DOCUMENTS

2005/0249641 A1    11/2005    Blankenstein et al.

FOREIGN PATENT DOCUMENTS

RU            72155 U1    4/2008
RU       2463282 C1    10/2012
(Continued)

OTHER PUBLICATIONS

English Language Translation RU 2463282 Tomiltova et al. Oct. 10, 2012.*
(Continued)

*Primary Examiner* — Jennifer A Smith
(74) *Attorney, Agent, or Firm* — Maier & Maier, PLLC

(57) ABSTRACT

Method for converting brown coals, including leonardite, into humic fertilizers and fuel briquettes, comprising first grinding the raw material to less than 3 mm and subsequently treating it with water or water solutions, using liquid-phase mechanoactivation and/or mechanochemical activation, with a duty of water curve ranging from 0.9 to 2.5 and with reaction composition dispersion by chafing and dynamic shift by exposing the medium to a hydraulic impulse of sonic and infrasonic frequencies, by metered introduction of 10 to 40 MJ per cubic meter of mechanical energy, with automatic limitation of the energy in the sub-cavitation area for preventing the mechanochemical reactors from falling into cavitation modes; the method further comprises separation of converted suspension compositions into solid and liquid phases in the centrifugal force field, optionally acidizing the liquid phase with the withdrawal of humic acids from the liquid phase to the heavy phase and recycling of residual water.

11 Claims, 4 Drawing Sheets

(51) Int. Cl.
*B01J 19/18* (2006.01)
*C05F 11/06* (2006.01)
*C05G 3/04* (2006.01)
*C09K 17/42* (2006.01)
*C10L 5/36* (2006.01)

(52) U.S. Cl.
CPC ............... *C05G 3/04* (2013.01); *C09K 17/42* (2013.01); *C10L 5/361* (2013.01); *C10L 2290/06* (2013.01); *C10L 2290/08* (2013.01); *Y02W 30/43* (2015.05)

(58) Field of Classification Search
CPC ....... C10L 2290/06; C05G 3/04; B02C 13/22; Y02W 30/43
See application file for complete search history.

(56) References Cited

FOREIGN PATENT DOCUMENTS

| SU | 132071 | * | 11/1960 |
| SU | 1404501 | * | 6/1988 |
| SU | 1623971 A1 | | 1/1991 |

OTHER PUBLICATIONS

Chittibabu, III, K.S. Irrigation of Water (Duty&Delta) Mother Theresa Inst of Engg&Tech <https://www.slideshare.net/chittibabuchiru/irrigation-of-waterduty-and-delta> Oct. 3, 2016.*

International Search Report received for PCT Patent Application No. PCT/RU2014/000544 dated Dec. 18, 2014, 1 page.

Written Opinion in Russian Language of PCT/RU2014/000544 dated Dec. 10, 2014, 5 pages.

* cited by examiner

METHOD FOR COMPREHENSIVELY PROCESSING BROWN COAL AND LEONARDITE INTO HUMIC FERTILIZERS AND PREPARATIONS AND INTO FUEL BRIQUETTES, AND MECHANOCHEMICAL REACTOR FOR PROCESSING HIGHLY-VISCOUS MEDIA

The requirement for the environmental safety of humankind on the planet defines not only the dynamics, but also the structure of foodstuffs. Significant growth of the share of foodstuffs produced without using mineral fertilizers or with limited use of them has been observed in recent years in the global production of agricultural products. A certain trend of rejection of foodstuffs of animal origin whose recovery is associated with the use of antibiotics and biostimulants has also been observed. Processes with the use of humates are a well-known, true-and-tried alternative that is already in use in comparison with the established agricultural industry processes.

Owing to the biological activity of humic substances (HSs), they are used as plant growth stimulants or as microfertilizers. HSs are used successfully as soil conditioners and ameliorants while also activating the activities of soil microorganisms. HSs can be used as detoxicating agents in contaminated territories. HSs are used as non-specific adaptogenes and biogenic stimulants in medicine and as enterosorbents in veterinary medicine [1]. Furthermore, HSs (humic acids—HAs) are used effectively in animal husbandry and poultry farming, as well as in fish farming.

The most widespread processes of HS production are the processes of their extraction from fossil raw material, e.g., by leaching.

The HAs separated are an ARTIFACT, and not because there are PROTOHUMIC acids in the raw material, which, as was thought before, change their composition when separated in the open air, but because oxidizing and hydrolytic reactions occur due to the existence of ester bonds in brown coals, which translates into the need for their repeated processing with alkaline solutions. In this case, more HAs are often obtained than there are in the raw material being converted [5, p. 27].

The useful humin-containing agent process units develop in two directions with the use of leaching—recovery of ballast and ballastless commercial products. It is the ballastless humates that are called growth PREPARATIONS or stimulants more often, while ballast humates are called FERTILIZERS, which is due to the different methods of their application and their different dosages [2].

Humic substances are not separated from the raw material—the whole bulk of coal or peat mass—during the production of ballast humates. They are applied in considerably large doses comparable with the generally accepted doses of conventional organic fertilizers (common doses being 0.25 to 5 t/ha with higher values also possible). What is more, the production of these FERTILIZERS calls for their enrichment with fertilizer elements (nitrogen, phosphorus, potassium and micronutrients) during processing with chemicals in a number of cases.

The use of humic substances in the form of preparations is not usually accompanied by any significant influence on soil fertility in the sense of change in the chemical and physical characteristics of the soil, as the concentration of humic preparations is extremely low, and their use is often limited to the pre-seeding treatment of seeds or the foliar dressings of plants. Ballast humic fertilizers combine some of the properties of conventional organic fertilizers and classical humic preparations. Just like the latter, humic ballast fertilizers possess significant physiological activity while simultaneously exerting a noticeable reclaiming influence on the soil: improving its structural state, water-physical properties, contributing to the growth of nitrification power and the increase in phosphorous compound mobility.

However, the analysis of the known methods of organic humate-containing FERTILIZER and humic PREPARATION production shows not only great diversity in their production processes, but also great diversity in their qualitative characteristics, which is actually present in the global markets. The great diversity of such commercial products is due to, on the one hand, the specialization of the properties of various types of these products oriented towards the effectiveness of the cultivation of various plants, while on the other hand, this great diversity can be explained with the aspirations to create new inventions different from the known ones with all manner or improvements or just differences in the objectives of the commercial use of these inventions.

In the context of these circumstances, showing the opportunities of creating large-tonnage humin-containing substance process units using a flexible process ensuring the "flash-like" adaptation of such process units to the changing requirements of the market, which is, for instance, present in the motor vehicle industry, appears to be very useful.

The process part in the group of the presented inventions is oriented towards such raw material as brown coals and their subvariety—leonardite, which is determined by two reasons:

In the general case of humin-containing substance production practices, brown coals yield the largest amount of the most useful compositions in comparison with such humin-containing raw material as peat, sapropel, shists, peloids and wood, let alone natural water resources. For instance, leonardite contains up to 85% of humic substances [1], [3] (sea waters—up to 1 mg/l, river waters—up to 20 mg/l, swamp waters—up to 300 mg/l, soils—1 to 12%, peat—up to 40%).

The easier availability of effective raw material resources—brown coals—due to the immense scale of their use in power industry.

In view of the latter circumstance, the geography of the possible locations of the process units can be outlined due to the use of the group of the presented inventions. For instance, brown coals provide for some 4% of the world's power production (13% of Europe's power generation), but some countries are extremely dependent on the use of brown coal for power production, such as Greece (76%), Yugoslavia (67%) and Czech Republic (51%). The largest consumer of brown coals is Germany, where 28% of power is produced from brown coal. In Australia, low grade coal mining is prevalent in the state of Victoria, and that coal is consumed at the power plants near the place of extraction which produce 97% of the state's power or 25% of the whole power production of Australia [4].

TECHNICAL FIELD

The presented group of inventions belongs to the field of conversion of coal series caustobioliths, mostly brown coal raw material, including oxidized lignite—leonardite, in particular, to the large-scale production of agricultural technology humic substances and ensures moderate capital costs and process prime cost in production. The use of the group of inventions as a whole, due to the flexibility of the humin-containing substance production processes presented ensures a more complete raw material recovery with an increase in the effectiveness of raw material conversion owing to the "expansion" of the range of the commercial products manufactured.

PRIOR ART

A lot of solutions are known regarding the processes of conversion of brown coal raw material to organomineral fertilizers and preparations which can be grouped based on their physical and chemical effects (with the exception of rarely used processes):
  the processes of coal grinding to fine fractions;
  oxidizing processes;
  leaching processes;
  solution processes, mostly in a water medium;
  electrochemical processes;
  acidic deposition processes;
  sedimentation processes;
  filtration, centrifuging and decantation processes;
  thickening and evaporative drying processes.

The majority of the well-known solutions are oriented towards industrial use as the preparation of one basic commercial product with its modifications, e.g. with the use of additives in the form of mineral fertilizers and/or micronutrients.

However, the presented invention, due to its structure, is oriented towards industrial use accompanied by process flexibility for the production of a certain range of products, i.e.:
  the production of ballast organic fertilizers (suspended gels);
  the production of ballast organomineral fertilizers (suspended gels);
  the production of humic biologically active preparations (ballastless solutions of humic acid compositions of various concentrations and with various minimum residual solid fraction composition by size);
  the production of fulvic acids—highly biologically active preparations (ballastless solutions of various concentrations and with various minimum residual solid fraction composition by size);
  the production of humic biologically active preparations (ballastless humic acid dry salts);
  the production of fulvic acids—highly biologically active preparations (ballastless fulvic acid dry salts—fulvates);
  the production of fuel briquettes.

The well-known technological processes of conversion of brown coal raw material to organomineral fertilizers and preparations mentioned above are used in their combinations. For instance, the coal raw material is ground, then subjected to oxidation and further processed with alkali, other processes following then. However, it can be that the raw material is oxidized in an alkaline medium immediately after grinding, and further technological conversions may be identical. Due to this fact and in accordance with the inventive conception of the proposed invention oriented towards process flexibility, it appears to be rational that substitute selection must be somewhat expanded. It is dictated by the fact that the physiological activity of humic preparations depends significantly on the characteristics of the raw material, its ash content and the degree of oxidation of its humic substances, and on the peculiarities of technological processes [5, p. 4], as well as due to the width of the range of humic fertilizer and preparation use. For instance, fulvic preparations, which possess unprecedented biological activity, are represented as part of the marketable product range in the proposed invention. While analyzing and generalizing the known technological solutions during the preparation of the invention presented, it was expected to see that, on the whole, technological processes are some combinations selected from such categories as: reagent types and concentrations, conversion time [6, 7, 9, 12, ÷14, 16÷23, 26, 29, 33, 38÷41, 53÷55, 59, 60, 63, 64, 66, 68, 87], duty of water curve [9, 12, 16 22, 26, 29, 33, 37÷40, 53÷55, 59, 60, 86, 87], pH value [9, ÷12, ÷14, 16, 20, 22, 23, 26, 29, 31, 33, 41, 53÷55, 59, 61, 63, 67, 68], conversion type—isochoric [14, 16, 18, 26, 39, 53, 55, 86] or in-flow [15, 17, 19, 20, 22, 55], temperature [6, 7, 9, 13, 15, ÷21, 40, 26, 29, 33, 36, 38, 39, 41, 52, 58, 59, 63, 64, 66, ÷68, 86, 87], static pressure [13, 36, 41, 58, 62, 63, 66]; or some certain hydrodynamic data, such as the rotation speeds of certain agitators and cavitators [21, 29, 26, 38, 40, 41, 53, 55, 59, 87], centrifuge speeds and accelerations [22, 41, 64], or hydroacoustic effect frequencies [15, 18, 19, 60, 68] and even the specific sound pressure capacities per area unit of the compositions being converted [20, 56, 60, 68], the values of magnetic induction [57] and its frequency [58], as well as the currents and voltages [53, 61, 65, 67] carried to the media converted are specified. At the same time, the author of the invention presented has not detected the use of such a parameter as the introduction of mechanoactivational energy expressed in joules per cubic meter except for Russian solution [20].

It appears to be important, as such a parameter "would show" the kinetics and numerical mechanics of localized effect on the supramolecular structures of the basic, e.g. brown coal, raw material and on the activation of conversion of the largest, protohumic molecules. It is obvious in this case that a part of the mechanical energy ensures the destruction of supramolecular structures, which can be interpreted as an increase in the reaction areas of the raw material component and its dynamic cleaning, whereas the other part of the mechanical energy is inherently associated with the concept of mechanochemical activation, owing to which static and differently directed dynamic pressures are created locally in the contact areas of reaction components.

It is also obvious here that the mechanical energy will be transformed to the heat of the medium being converted, and it is reasonable to take it into account regardless of the conditions of potential external heating of reaction mixtures.

With reference to the above, the concept of the use of programmable metered introduction of the mechanical energy of the activation of the medium being converted into it with a view to optimizing the technological process is applied in the invention presented. At the same time, such a concept does not preclude the possibility of numerical variations with some reaction components or other, but supplements them with the provision of the opportunity for numerical variation through the introduction of mechanical energy into reaction mixtures. In this case, such parameters as specific dynamic pressure amplitude and frequency, shift speed, localized temperature surges and changes of temperature in general, as well as conversion time can change in reaction mixtures in a programmed and "smooth" manner, through the regulation of shift or impact-and-shift effects.

In accordance with the inventive conception, the concept of the programmed change in the dosage of introduction of mechanical energy into the compositions being converted includes the sense of the use of the yield of several pilot batches of the target products, with variations of process characteristics, and the numerical presets ensuring the selected optimality of the production process in commercial volumes are programmed based on the results of the comparative analysis of these pilot batches. In this case, it is also understood that mechanical energy dosage in mechanochemical reactors can have wide ranges, and parts of that range can be conveniently associated with the duty of water curve:

the "energetically moderate" agitation modes (duty of water curve: 0.15 to 1.5) used, for instance, in [24, 25];

the "energetically excessive" agitation and hydrodynamic or acoustic cavitation modes (duty of water curve: 1.5 to 4 and higher), e.g. [19, 26];

the hydrodynamic and energetically developed cavitation modes, i.e. those with small $\chi$-cavitation indexes [8, p. 236, 237] and at relatively large flow speeds (duty of water curve: 2 to 300);

the "highly energetic agitation" modes—part of the presented invention, with automatic parameter maintenance in the sub-cavitation area regardless of the drift of the rest of the basic parameters (duty of water curve: 0.9 and higher).

Here, the concept of the sub-cavitation area introduced in the presented invention, in accordance with the inventive conception, implies a certain new optimization of technological processes based on the following:

With a certain composition of conventionally fixed parameters of the mechanochemical conversion of raw material components or semi-products, the productivity and sometimes quality of the products yielded turn out to be directly proportional to the mass transfer of reaction components, which is evidently due to the increase of the mechanical energy introduced into the medium being converted, but to some certain limits;

One of such technically easily recorded limits is the "threshold" of the transfer of the mechanochemical reactor to cavitation mode. With an increase in the energy of this mode, conversion effectiveness mostly corresponds with the extremum function. In this case, it is implied that the section of the extremum function to the left of its maximum value is significantly smaller than the section situated to the right of the maximum value. In practice, it results in the fact that processes of strong mechanodestruction of the components being converted at large cavitation energies, and useful substances are destroyed.

Due to this fact, one of the new solutions in the presented invention ensures automatic maintenance of the mechanochemical reactor modes in the sub-cavitation area in which so much mechanical energy is introduced into the media being converted, which ensures a certain maximum mass transfer to reaction components, on the one hand, and on the other hand, a restriction on the mechanical energy introduced into the medium being converted is ensured to prevent the operation of the reactor from switching to cavitation modes. Such a restriction is introduced due to the fact that sometimes ultrasound processing, including cavitation processing, may have a significant negative effect [18, 19].

American invention [9], "A METHOD OF FULVIC ACID MOLECULE EXTRACTION", oriented towards the large-scale production of fulvic acids having the highest degree of biological activity and extracted from leonardite, without using chemicals, which allows obtaining a commercial product that can be certified as "organic", is known. According to this invention, the humus material is mixed with water, and a certain small amount of fulvic acid molecules is dissolved. Then, biological conversion of the mixture is applied to increase product yield by means of microorganisms in the presence of oxygen for 1 to 7 days, the organic components of the raw material being oxidized. Then the process of microfiltration is applied, where the fulvic acids dissolved are separated from humin molecules and (at least partially) from humic acid molecules. After that, vacuum drying or moisture freeze-out with granulae of fulvic acids being obtained can be used.

It shares such features as the use of a finely divided humus raw material—leonardite,—the preparation of a mixture of the raw material with water, fulvic acid water extraction, filtration and vacuum drying with dry fulvic acid salts being obtained with the proposed invention.

The reasons impeding the technical result for the production of fulvic acids as a part of the presented invention being obtained in comparison with the invention described in [9] are:

insufficient flexibility of the process not ensuring the width of the range of the marketable products being released (ballast organic and organomineral fertilizers in the form of suspended gels, ballastless solutions of humic acid compositions, ballastless fulvic acid solutions and fuel briquettes are not "represented");

low manufacturing capacity regarding the process operating procedures of the basic equipment due to the time of raw material conversion to fulvic acids in 1 to 7 days as opposed to 10 to 20 minutes for the presented invention;

the lack of mechanoactivation use in the processes of extraction (dissolution and bioconversion-oxidation), including the adaptively optimized one, which results in a relatively low product yield;

the lack of processes of decantation through centrifuging and humic substances sedimentation that ease the operation of filters significantly;

the lack of use of the volatile substances contained in the source coal;

the lack of recovery of the residual coal to a marketable product;

the lack of recovery of the discharge moisture at a relatively large duty of water curve of 7 to 8;

the lack of the use of the combustion heat of the residual coal raw material.

An American inventive solution also relevant to fulvic preparation recovery, [10], "THE EXTRACTION OF FULVIC MINERAL RESOURCES FROM HUMIC SUBSTANCES", is known. The concept of that invention is the achievement of a goal—obtaining fulvic solutions having high biological activity and safe for internal and external use in humans and animals, as well as for spraying plant foliage, which is achieved relatively easily. Safety is ensured by acids not being used in the technological process; water and those alkaline extraction agents which are safe, e.g. calcium and magnesium hydroxides, are used, whereas a decrease in pH value is ensured by simply decanting the solution. After the decantation of the solution, the fulvic acid fraction that has risen is collected.

It shares such features as the use of a raw material containing humic substance complexes, extremely probably the raw material grinding process (no data available), the use of water in the leaching process and the leaching process itself, as well as the separation (through different processes) of fulvic components from the solution in a liquid form with the presented invention.

The reasons impeding the technical result for the production of fulvic acids as a part of the presented invention being obtained in comparison with the invention described in [10] are:

insufficient flexibility of the process not ensuring the width of the range of the marketable products being released (ballast organic and organomineral fertilizers in the form of suspended gels, dry fulvates and fuel briquettes are not "represented");

low manufacturing capacity regarding the process operating procedures of the basic equipment due to the time of raw material conversion to fulvic acids due to the relatively long (no data available) process of the natural decantation of the solution as opposed to 10 to 20 minutes for the presented invention;

the lack of mechanoactivation use in the processes of extraction, including the adaptively optimized one, which results in the product yield of relatively low concentrations;

the lack of processes of decantation through centrifuging and humic substances sedimentation and filtration, which lowers the yield of the product from the solution;

the lack of use of the volatile substances contained in the raw material;

the lack of recovery of the remainder of the raw material to a marketable product;

the lack of recovery of the discharge moisture contained in the remainder of the raw material;

the lack of the use of the combustion heat of the residual raw material.

American invention [11], "EXTRACTION OF FULVIC MINERAL RESOURCES, VITAMINS, AMINO ACIDS, ENZYMES AND PHYTONUTRIENTS FROM HUMIC SUBSTANCES", is known. The technological essence of that invention is almost the same as that of the invention described above, [10], except for the list of the organic substances obtained that is expanded in accordance with the title of this invention [11]. Due to this fact, it does not appear to be rational to describe here the features shared by it with the proposed invention and describe the reasons impeding the technical result for the production of fulvic acids and other products as a part of the presented invention in comparison with the invention described in [11].

American invention [12], "FERTILIZER", is known. Organic fertilizers that include organic carbon are obtained according to this invention from natural organic substances, preferably from peat or coal.

According to this invention, three product type groups are produced:

a range of 16 products that are "liquid", low-ballast organomineral and highly-concentrated fertilizers with a moisture content of approximately 60 to 80% at the initial technological process duty of water curve of 6 to 13 and with an almost neutral pH value=6.5 to 7;

a "liquid" calcium propionate, low-ballast composition with a moisture content of approximately 70%, with a neutral pH value=6.5 to 7, that is a composition of nutrients improving the cellular structure of plants and is a broad-spectrum biocide, successfully fighting plant diseases (22 diseases being on the list);

a conventionally dry (15 to 20% of moisture) ballast organomineral fertilizer that is obtained from finely divided peat and propionic acid with the addition of potassium sulfate or potassium chloride and micronutrients.

To ensure the safety features of the products for this invention, [12], within the primary technological conversions, potassium hydroxide, which is used, for instance, in food industry, with the duty of water curve of 6 to 13, is applied during the leaching of physiologically active organic carbon substances. As for the use of acids, here product safety is ensured through the application of ethylenediaminotetraacetic acid (TRILON B) or the application of propionic acid.

The first one, TRILON B, is a coagulant ion. The mechanism of its effect is based on the extraction of metal ions from insoluble metal salts and their substitution with sodium ions, almost all of whose salts are water soluble, 1 molecule of trilon reacting with 1 molecule of metal regardless of the valence of the metal.

The second one, propionic acid, is a safe preservative in food industry that is also used in drug production. Moreover, this acid hinders the growth of mold and some bacteria.

This relatively new invention [12] (US patent of 2011) shows the modern and cutting-edge achievements in agricultural chemistry by means of which foodstuffs defined as organic and capable of being certified accordingly can be grown with high yields.

Due to this fact the use of the presented invention as a complex of process units ensures the production of the same organic fertilizers or those similar to them, as well as others. The discussion of the components of invention [12] written somewhat above cannot be considered as the priority one against the proposed invention at least due to the fact that the proposed invention (as part of a group) is oriented in general towards a functional structure—a complex of process units with new properties both of the units themselves and of the functional structure. A discussion of the components of invention [12] is given here to describe the modern situation in the field of the relevant technology and is not construed as an assumption that the thing discussed takes priority.

It shares the following features with the presented invention:

the use of the basic raw material containing natural organic carbon complexes—humic substances (coal);

an extended range of marketable product types;

the processes of basic raw material grinding;

the processes of liquid phase leaching in water solutions;

the processes of semi-product mixtures processing with acids to lower pH values;

the processes of adding mineral substances and organic acids to the semi-products being converted;

the processes of adding micronutrients to the semi-products being converted.

The reasons impeding the technical result for the production of organomineral fertilizers and preparations as a part of the presented invention being obtained in comparison with the invention described in [12]:

insufficient flexibility of the process not ensuring the width of the range of the marketable products being released (ballastless fulvic acid solutions, dry fulvates and fuel briquettes are not "represented");

low manufacturing capacity regarding the process operating procedures of the basic equipment due to the time of complete raw material conversion to the products in 13 to 25 hours as opposed to 10 to 20 minutes for the presented invention;

the lack of mechanoactivation use in the process of extraction, including the adaptively optimized one, which results in a reduced organic carbon concentration in the semi-product fertilizer;

the lack of processes of active decantation through centrifuging and filtration, which results in a reduced organic carbon concentration in the semi-product fertilizer;

the lack of recovery of the discharge moisture contained in the remainder of the raw material;

the lack of use of the volatile substances contained in the source coal;

the lack of recovery of the residual organic raw material, e.g. coal, to a marketable product;

the lack of the use of the combustion heat of the residual organic raw material.

American invention [13], "HUMIC ACID SEPARATION", is known.

The method of humic acid separation consists in the use of raw oxidized coal which is mixed with a sodium hydroxide water solution, the mixture obtained being heated under the pressure of 0.5 MPa to a temperature of 100 to 160° C. At such parameters, with a duty of water curve of 5 to 7, the mixture is allowed to stand for 1 to 2 hours, which results in humic acid extraction. Then, the product is separated from the remainders by means of separation.

It shares the following features with the presented invention:

the use of the basic raw material—oxidized coal;

most likely, coal grinding processes (not specified);

the processes of liquid phase leaching in water solutions;

the processes of active decantation through centrifuging.

The reasons impeding the technical result for humic acid separation as a part of the presented invention being obtained in comparison with the invention described in [13];

insufficient flexibility of the process not ensuring the width of the range of the marketable products being released (ballast organic and organomineral fertilizers in the form of suspended gels, ballastless fulvic acid solutions, dry fulvates and fuel briquettes are not "represented");

low manufacturing capacity regarding the process operating procedures of the basic equipment due to the time of complete raw material conversion to the products in 1.5 to 2.5 hours as opposed to 10 to 20 minutes for the presented invention;

relatively high power consumption due to the operation of the reactor at high temperatures under pressure;

the lack of mechanoactivation use in the process of extraction, including the adaptively optimized one, which results in a certain reduction of humic acid concentration in the finished product;

the lack of recovery of the discharge moisture contained in the remainder of the raw material;

the lack of use of the volatile substances contained in the raw material coal;

the lack of the use of the combustion heat of the residual raw material;

the lack of recovery of the residual raw material to a marketable product.

American invention [14], "A METHOD OF FULVATE CALCIUM PRODUCTION FROM A HUMUS MATERIAL", is known. The invention implies the use of leonardite as the raw material source containing a priori the largest amount of humic substances. The fulvate calcium production process begins with the raw material being crushed in a hammer mill and mixed with water and sodium hydroxide in a ratio ensuring pH=10.0.

Then, the alkaline solution is mixed with coal at a duty of water curve of 175 to 300 for 15 to 30 minutes with humic and fulvic acids being extracted in the process while humin remains insoluble. Then, while hydrochloric acid is added to the suspension obtained for 15 to 30 minutes with the suspension being agitated, humic acids are "sedimented" into a solid form, which is done with pH=4.5. During this, fulvic acids remain dissolved in the suspension. Then, large and stable flocks are formed from humic acid solid particles for 1 hour with a thickening unit being used and a flocculant being added to the suspension.

After that, the fulvic acid solution separated from the solid fractions is sent from the thickener to the sediment trap, and a highly concentrated suspension is sent from the bottom part of the thickener to a certain unit, the so-called elevator with which a filtrate solution that is added to the extraction process mentioned above is separated from the suspension, while the remaining waste is withdrawn from the same elevator.

Calcium hydroxide is added to the fulvic acid solution in the sediment trap by mixing the composition for some 15 minutes, the pH value rising to 13.5, which ensures the sedimentation of fulvic acids in the form of calcium fulvate. Waste in the form of a certain solution is washed away at the filter from its suspension with the product, calcium fulvate, being thus obtained, including its granulation later on.

The features it shares with the presented invention include the technological processes ensured by the composition of equipment in the presented invention:

the use of the best raw material possible—leonardite;

grinding the raw material to fine fractions;

humic acid extraction in water-alkaline solutions;

the "sedimentation" of humic acids from the solution using acid;

the use of flocculants to aggregate the finely divided particles of humic acids into large and stable flocks;

the processes of roughing the process suspension into solid and liquid phases with a semi-product solution obtained;

the processes of semi-product filtration (characterized by "reverse" process functionality—the semi-product is in the solid phase after being "sedimented" with an increase in pH up to 13.5 in invention [14], while in the presented invention, the semi-product is in the liquid phase);

the processes of product drying.

The reasons impeding the technical result for fulvate production as a part of the presented invention being obtained in comparison with invention [14];

insufficient flexibility of the process not ensuring the width of the range of the marketable products being released (ballast organic and organomineral fertilizers in the form of suspended gels, ballastless humic acid composition solutions, ballastless humic acid dry salts, ballastless fulvic acid solutions and fuel briquettes are not "represented");

low manufacturing capacity regarding the process operating procedures of the basic equipment due to the time of complete conversion of the raw material to the product in 2 to 2.5 hours as opposed to 10 to 20 minutes for the presented invention;

the lack of mechanoactivation use in the process of extraction, including the adaptively optimized one, which results in a certain reduction of humic acid concentration in the finished product;

the lack of recovery of the discharge moisture contained in the remainder of the raw material and contained in the outgoing solution;

the lack of use of the volatile substances contained in the source coal;

the lack of the use of the combustion heat of the residual raw material;

the lack of recovery of the residual raw material to a marketable product.

A process solution presented in [16], "A METHOD OF HUMIC ACID WITHDRAWAL", is known. In this relatively simple solution, the "classical" sequence of technological conversions is used, and the peculiarity of the invention is the use of LAURYL SULFATE TRIETHANOLAMINE SALT, which, given the simplicity mentioned, ensures humic acid salts being obtained with a maximum yield of 99.4%.

Here the withdrawal of humic acids from brown coal is carried out by means of extraction with a 2 to 2.5% water alkaline solution with a lauryl sulfate triethanolamine salt used 1:0.25 weight to weight at 85 to 90° C. and with a duty of water curve about 10, a semi-product being subsequently separated by diluting the reaction mixture with water (1.5 times), with acidification to pH=3.5 to 4 and agitation. The semi-product is further filtered and dried. It shares the following features with the presented invention:
the use of brown coal raw material;
grinding the raw material to fine fractions (not specified but highly probable);
humic acid extraction in water alkaline solutions;
"sedimentation" of humic acids from the solution using acid;
the process of semi-product suspension filtration;
the process of drying the filtrate to a marketable product.

The reasons impeding the technical result for the production of fulvates as a part of the presented invention being obtained in comparison with invention [16];
insufficient flexibility of the process not ensuring the width of the range of the marketable products being released (ballast organic and organomineral fertilizers in the form of suspended gels, ballastless humic acid composition solutions, ballastless fulvic acid solutions, ballastless dry salts (fulvates) and fuel briquettes are not "represented");
relatively low manufacturing capacity regarding the process operating procedures of the basic equipment due to the time of complete raw material conversion to the product (about 1 hour as opposed to 10 to 20 minutes for the presented invention);
the lack of mechanoactivation use in the process of extraction, including the adaptively optimized one, which results in the use of an additional reagent and increases the conversion time;
the lack of recovery of the discharge moisture contained in the remainder of the raw material and contained in the outgoing solution;
the lack of use of the volatile substances contained in the source coal;
the lack of the use of the combustion heat of the residual raw material;
the lack of recovery of the residual raw material to a marketable product.

A process solution close to the "classical" one, [17], "THE PROCESS OF OBTAINING SOLUBLE HUMATES FROM PEAT", is known. According to this process, peat is ground to 1 to 2 mm, mixed with a 2% solution of sodium carbonate or sodium hydroxide (duty of water curve: about 10), and this mixture is processed in a mechanical disperser. Humic acids are finally extracted in the reactor with the suspension being heated to 80 to 10° C. and agitated intensely for 0.5 to 1.0 hours. During this, the reactor is powered with live steam from an external source through an ejector. The unreacted peat is separated from the humate solution with a centrifuge and washed with additional water. The washed sediment is sent to the dump, and the washing water from the centrifuge (in order to decrease humate loss) is sent to prepare the soda liquor.

The weak, 2% humate solution obtained is boiled down under some vacuum to a concentration of 15%.

It shares the following features with the presented invention:
the use of a raw material with a similar composition;
carrying out the basic processes in a flow;
grinding the raw material to fine fractions;
humic acid extraction in water alkaline solutions;
mechanochemical activation during extraction;
the separation of ballasts from the semi-product suspension by means of centrifuging;
vacuum drying;
the use of a water component in recycles.

The reasons impeding the technical result for the production of humic acids as a part of the presented invention being obtained in comparison with the process described in [17];
insufficient flexibility of the process not ensuring the width of the range of the marketable products being released (ballast organic and organomineral fertilizers in the form of suspended gels, ballastless fulvic acid solutions, ballastless dry humates, ballastless dry salts (fulvates) and fuel briquettes are not "represented");
relatively low manufacturing capacity regarding the process operating procedures of the basic equipment due to the time of complete raw material conversion to the product, 0.5 to 1 hours as opposed to 10 to 20 minutes for the presented invention;
the lack of adaptively optimized mechanoactivation use in the process of extraction, which increases the raw material conversion time and results in a relatively low product yield—20.6% for dry peat;
the lack of use of the volatile substances contained in the raw material;
the lack of the use of the combustion heat of the residual raw material;
the lack of recovery of the residual raw material to a marketable product.

Invention [18], "A METHOD OF HUMIC ACID WITHDRAWAL FROM BROWN COAL", is known. Here, a 96% yield of humic acids is obtained through processing brown coal with INFRASOUND, in a relatively wide class of 2 . . . 6 mm, with ammonia, at a temperature as low as 20 to 30° C. and with a duty of water curve of about 9! The raw material conversion time in this case is only 5 to 6 minutes.

This invention has an extremely high research value showing experimentally that as the conversion temperature of brown coal raw material rises above 30 and up to 100° C., humic acid yield declines almost by half.

However, it is shown here [18] that humic acid yield is 2.5 to 2.7 times higher if a water and ammonia suspension is processed with INFRASOUND vibrations with frequencies of 15 to 20 Hz! Extraction time in this case becomes 17 to 24 times shorter!

It shares the following features with the presented invention:
the use of brown coal raw material;
the use of brown coal raw material of close fractions;
carrying out extraction processes at low temperatures;
applying low-frequency mechanoactivation effects to the medium being converted;
the duration of the technological processes—several minutes.

The reasons impeding the technical result for the production of humic acids as a part of the presented invention being obtained in comparison with the process described in [18];
the lack of process flexibility; only one product—ballast humic acid solution—is manufactured (ballast organomineral fertilizers in the form of suspended gels, ballastless humic acid solutions, ballastless fulvic acid solutions, ballastless dry humates, ballastless dry salts (fulvates) and fuel briquettes are not "represented");

low manufacturing capacity due to small reactor volume;

the use of an isochoric type process;

the lack of adaptively optimized mechanoactivation use in the process of extraction, which could additionally reduce the raw material conversion time;

the lack of use of the volatile substances contained in the raw material.

Invention [19], "A METHOD OF OBTAINING HUMIC ACIDS AND A DEVICE FOR IT", is known. According to this invention, a highly concentrated (18%) humic acid solution is obtained from oxidized brown coal or from peat using leaching with a duty of water curve of 2 and accompanied by LOW FREQUENCY acoustic vibrations. The leaching process is carried out at the optimal temperature of 60 to 80° C. for 5 to 10 seconds.

Humic acid separation in this case is 98.2 to 100%.

It is declared in this invention [19] that, owing to the application of LOW FREQUENCY ACOUSTIC VIBRATIONS with a certain effect of vibrating cavitation streams, the coal conversion time is decreased HUNDREDS OF TIMES, just like the productivity of the process—HUNDREDS OF TIMES as well!

It shares the following features with the presented invention:

the use of coal series caustobioliths as the raw material;

the use of brown coal raw material of close fractions;

carrying out extraction processes at low temperatures;

carrying out technological processes in a flow;

the duration of the technological processes—several minutes;

applying low-frequency mechanoactivation effects to the medium being converted;

mechanical separation of the solid and liquid phases.

The reasons impeding the technical result for the production of humic acids as a part of the presented invention being obtained in comparison with the process described in [19]:

the lack of process flexibility; only one product—ballastless humic acid solution—is manufactured (ballast organic and organomineral fertilizers in the form of suspended gels, ballastless fulvic acid solutions, ballastless dry humates, ballastless dry salts (fulvates) and fuel briquettes are not "represented");

the lack of adaptively optimized mechanoactivation use in the process of extraction, which could optimize the technological processes relative to the characteristics of various raw materials from the caustobiolith coal series;

the lack of use of the volatile substances contained in the raw material;

the lack of the use of the combustion heat of the residual raw material;

the lack of recovery of the residual raw material to a marketable product.

Russian invention [23], "A METHOD OF PRODUCTION OF HUMIC ACID CONCENTRATE FROM BROWN COAL AND A LINE FOR HUMIC ACID CONCENTRATE PRODUCTION", is known. It is a method that includes grinding brown coal until microparticles are obtained, preparing a suspension in a weak alkaline solution and the extraction of humic acid characterized by the fact that the coal is subjected to two-stage grinding, a classical high-speed rod mill applied at the second stage of grinding, during the mechanical mixing of the suspension in the reactor-mixer from coal microparticles, and while the suspension is mixed in the reactor-mixer, it is simultaneously affected by ultrasound for 7 to 15 minutes. Then, the separation of the solid phase from the liquid one is carried out by means of the sedimentation of the insoluble ash coal in the sediment trap for 15 to 20 minutes, while the liquid phase is sent to the cracking case, a catalyst (hydrochloric acid) is introduced, the liquid phase is split into water and 90%, 70% and 40% concentration humic acid after at least 24 h of sedimentation. At the same time, the pH of the marketable humic acid concentrates is regulated by changing the concentration of the hydrochloric acid introduced into the cracking case, whereas the water is returned to the reactor-mixer for a recycle.

It shares the following features with the presented invention:

the use of brown coal raw material of close fractions;

brown coal raw material crushing;

most likely (not specified), the performance of the processes of extraction and reaction mixture splitting into humic acids and "water" at low temperatures;

carrying out most of the technological processes in similar units;

the duration of the technological processes—several minutes;

applying low-frequency mechanoactivation effects to the medium being converted;

mechanical and gravitational separation of the phases;

the use of discharge "water" in recycles.

The reasons impeding the technical result for the production of humic acids as a part of the presented invention being obtained in comparison with the process described in [23]:

the lack of process flexibility; only one type of products—ballastless humic acid solutions (gels) of various concentrations—is manufactured (ballast organic and organomineral fertilizers in the form of suspended gels, ballastless fulvic acid solutions, ballastless dry humates, ballastless dry salts (fulvates) and fuel briquettes are not "represented");

the lack of adaptively optimized mechanoactivation use in the process of extraction, which could optimize the technological processes relative to the characteristics of the raw materials used (brown coal) and could diversify the use of raw materials from the caustobiolith coal series;

the lack of use of the volatile substances contained in the raw material;

the lack of the use of the combustion heat of the residual raw material;

the lack of recovery of the residual raw material to a marketable product.

A Russian invention is known [20], "A METHOD OF OBTAINING ORGANOMINERAL FERTILIZERS", that consists in the fact that a mixture of an alkaline solution with the minimum pH of 12 with any coal series caustobiolith raw material is prepared in advance, and a cavitation dispersion through the effect of ultrasound radiation at the SPECIFIC POWER RATIO of 1 to 4 W per 1 cm3 is carried out then in the mixture processing zone for 5 to 15 minutes. After that, an amount of orthophosphoric acid ensuring the decrease in pH to 2 to 1 is added to that mixture. Then, that solution is processed with ultrasound radiation of the same parameters for the same time range, whereupon the solution obtained is mixed with an amount of alkali ensuring the neutralization of the solution to pH 7 to 7.5, and micronutrients are introduced into the liquid humic fertilizer further on.

As a result, ballast humates in liquid form are obtained.

A certain opportunity of control over the mechanoactivation applied during the conversion of the reaction mixtures, namely the metering of mechanical energy to these mixtures, seems to be an important circumstance in the invention in question.

This invention [20] shares the following features with the presented invention:
- the use of coal series caustobioliths as the raw material;
- raw material crushing (not specified but highly probable);
- most likely (not specified) the performance of extraction processes at low temperatures;
- the relatively close duration of the technological processes;
- the application of METERED MECHANOACTIVATION EFFECTS for the reaction compositions being converted.

The reasons impeding the technical result for the production of humic acids as a part of the presented invention being obtained in comparison with the process described in [20]:
- the lack of process flexibility; only one type of products—ballast humic acid solution (suspensions, gels) with micronutrients—is manufactured (ballastless organic and organomineral fertilizers in the form of suspended gels, ballastless fulvic acid solutions, ballastless dry humates, ballastless dry salts (fulvates) and fuel briquettes are not "represented");
- the lack of adaptively optimized mechanoactivation use in the process of extraction, which could optimize the technological processes relative to the characteristics of various raw materials—coal series caustobioliths;
- the lack of a "water" recycle process;
- the lack of use of the volatile substances contained in the raw material;
- the lack of the use of the combustion heat of the residual raw material;
- the lack of recovery of the residual raw material to a marketable product.

Russian invention [21], "A METHOD OF OBTAINING NITROGEN-CONTAINING HUMIC FERTILIZERS FROM PEAT", is known. Here peat is converted with ammonia water solution at a concentration of 0.5 to 5.0% for 30 minutes in a rotor cavitation unit, an amount of hydrogen peroxide equal to 5 to 20% of the weight of absolutely dry peat is added, and oxidation with an intensive cavitation effect is carried out for 15 to 60 min at a temperature of 60° C. with the duty of water curve being 2. Then, the liquid phase from which the dry product is prepared by vacuum drying is separated from the mixture obtained by centrifuging.

It shares the following features with the presented invention:
- the use of a coal series caustobiolith raw material;
- raw material crushing (not specified but highly probable);
- the performance of the basic raw material conversion processes at low temperatures;
- applying mechanoactivation effects to the reaction compositions being converted;
- close duty of water curve values;
- the use of the processes of active mechanical division of reaction mixtures into solid and liquid phases;
- the use of the processes of liquid phase concentration to a conveniently dry product by means of vacuum drying.

The reasons impeding the technical result for the production of humic substances as a part of the presented invention being obtained in comparison with the process described in [21]:
- the lack of process flexibility; only one product—conveniently dry ballastless humic nitrogen-containing fertilizer—is manufactured (ballast organic and organomineral fertilizers in the form of suspended gels, ballastless humic acid composition solutions, ballastless fulvic acid solutions, ballastless dry salts (fulvates) and fuel briquettes are not "represented");
- the lack of adaptively optimized mechanoactivation use in the basic processes of reaction composition conversion, which could improve the effectiveness of the technological processes;
- the lack of a water recycle process;
- the lack of use of the volatile substances contained in the raw material;
- the lack of the use of the combustion heat of the residual raw material;
- the lack of recovery of the residual raw material to a marketable product.

A Russian process solution represented in [6, 7], "A UNIT FOR OBTAINING HUMIC SUBSTANCES", is known. Here the effectiveness of the transformation of brown coals into humic substances is based on the opportunity of partial reconfiguration of the flow of the medium being converted through the equipment if raw material coal with a low humic substance yield is used. The process solution is represented by the following conversions:
- Brown coal crushing to 0 . . . 2 mm grade;
- Ensuring the minimum moisture content of 30% in the coal;
- Mixing the crushed moist coal with dry alkali;
- Keeping the coal and alkali mixture at room temperature until the complete dissolution of the alkali in the moisture of the coal (1 hour);
- Drying the coal and alkali mixture completely by blowing it with air at a temperature of 130 to 150° C. for 4 to 7 hours;
- Isochoric water extraction at a temperature of 90 to 100° C. (1 hour);
- Suspended extract microfiltration;
- If necessary, extract concentration at the reverse osmosis unit;
- Drying the humate solution obtained with hot air to a paste-like state;
- Vacuum drying of the humates to powders with a water content of 8 to 10%.

This process shares such features as the existence of process flexibility—the opportunity of reconfiguring the flow of the medium being converted through the equipment, raw material coal crushing, ensuring regulated moisture contents, an extremely different extraction process, extract filtration and the vacuum drying of the preparations to a powder-like state—with the proposed invention.

The reasons impeding the technical result that is ensured by the presented invention being obtained in comparison with the process described in [6, 7]:
- insufficient process flexibility not ensuring the width of the range of the marketable products being released (ballast organic and organomineral fertilizers in the form of suspended gels, ballastless humic acid composition solutions, ballastless fulvic acid solutions and fuel briquettes are not "represented");
- low manufacturing capacity regarding the process operating procedures of the basic equipment due to the time of raw material conversion to humic substances in 6 to 9 hours as opposed to 10 to 20 minutes for the presented invention;

the lack of a liquid-phase oxidizing process ensuring a significant increase in humic substance yield, as specified in [27];

the lack of mechanoactivation (including the adaptively optimized one) use in the extraction process;

the lack of the processes of decantation by centrifuging and humic substance sedimentation that ease the operation of filters significantly;

the lack of use of the volatile substances contained in the source coal;

the lack of recovery of the residual coal to a marketable product;

the lack of recovery of the discharge moisture at a relatively large duty of water curve amounting to 23 to 33;

the lack of the use of the combustion heat of the residual coal.

Russian invention [15], "A METHOD OF OBTAINING ORGANOMINERAL FERTILIZERS AND A PROCESS LINE FOR ITS IMPLEMENTATION", is known. The invention implies the release of two types of marketable products with the opportunity to modify their parameters to a certain extent due to the somewhat universal nature of the process. Products: liquid fertilizer, (suspended) ballast humic acids and dry granulated compound humic organomineral fertilizer.

This invention is the most suitable for the presented invention due to their common significant features and has been adopted as a prototype.

The analog [15] and the proposed invention share the following features:

the universal nature and flexibility of the process flow diagram that ensures the release of multiple types of marketable products with an opportunity to modify them;

the use of such raw materials as brown coal and water;

the performance of the basic processes in a flow;

the use of leaching processes based on water solutions with the duty of water curve exceeding 1;

the use of leaching processes with low alkali consumption;

the use of "liquid-phase" mechanoactivation and dispersion of reaction components in extraction processes (cavitation hydropercussion processing for analog [15], adaptively optimized mechanoactivation for the presented invention);

the use of vacuum drying processes during the recovery of plant biostimulant products;

the use of heat drying processes (the prototype: relevant for biostimulant products; the presented invention: applies to the production of biostimulant products and fuel briquettes);

the use of granulation processes (the prototype: relevant for biostimulant products; the presented invention: applies to the production of biostimulant products and fuel briquettes).

The reasons impeding the technical result for the preparation of organomineral humic fertilizers and preparations being obtained in comparison with invention [15]:

insufficient process flexibility not ensuring the width of the range of the marketable products being released (ballast organic and organomineral fertilizers in the form of suspended gels, ballastless humic acid composition solutions, ballastless fulvic acid solutions and fuel briquettes are not "represented");

the lack of a liquid-phase oxidizing process ensuring a significant increase in humic substance yield, as specified in [27];

the lack of adaptively optimized mechanoactivation use in the extraction and dispersion processes; the less effective processes of cavitation processing (of relatively high frequency) are used multiple times for the prototype [15] in comparison with the data in [18, 19];

the lack of the processes of decantation by centrifuging and humic substance sedimentation that ease the operation of filters significantly during the manufacturing of products "expanding" the product range significantly;

the lack of use of the volatile substances contained in the source coal;

the lack of recovery of the residual coal to a marketable product;

the lack of recovery of the discharge moisture at a relatively large duty of water curve that is not specified but exceeds 2 or 3;

the lack of the use of the combustion heat of the residual coal;

the use of additional external fuel to generate process heat;

the relatively large diversity of the processes used, which results in an excessively increased metal intensity of the equipment; a garbage recycling plant is actually added in the prototype invention for the sake of adding an organic and carbon raw material component (which is quite small in the overall volume of the residential solid waste converted in a plant like this); the same is pointed out in [28] as a drawback of invention [15], where the complexity of the technological process of obtaining organomineral fertilizers that includes, among other things, the processing of municipal residential solid waste of complex composition is referenced; the complexity of sorting solid residential waste consists in the large amount of plastic and polyethylene bags, wrappers and packaging, metal, wood, reinforced concrete and rubber inclusions in it; a separate process unit for the conversion of municipal residential solid waste must be singled out with the waste sorted simultaneously by use where it is collected (metal, glass, plastic, food waste, paper etc.).

Russian invention [22], "A METHOD OF OBTAINING WATER-SOLUBLE HUMIC ACIDS", is known. This invention is the closest to the presented invention by technical substance and has been selected as a prototype.

According to this invention, coal series caustobioliths previously ground to 1 to 10 mm are used as the raw material. This raw material is chafed in a 2.0 to 4.0% potassium or sodium hydroxide solution on a burr mill with a duty of water curve of approximately 0.5 to 2.0. The chafed suspension is divided in a centrifugal force field (1500 g) on a decanter into a solid phase (residual coal) and a liquid phase (humic substance solution). The residual coal is briquetted, whereas the humic substance solution is acidified to pH=2.1 to 2.5 with coagulated humic acids being formed within the suspension. Then, a heavy phase (coagulated humic acids) is recovered from this suspension in the centrifugal force field (1500 g), whereas the liquid phase is alkalinized and returned to the start of the technological process. After that, the coagulated humic acids are ground in the burr mill with a 2 to 4% solution of an alkaline or alkaline-earth metal added at a duty of water curve of 0.1 to 0.2 until pH=3.2 to 5.0 is reached.

As a result, the finished product is obtained—"dry" ballastless water soluble humic acids.

Prototype [22] shares the following features with the proposed invention:
- the use of such raw material as coal series caustobioliths;
- multiple types of marketable products being manufactured;
- the performance of the basic processes in continuous flows;
- the use of leaching processes based on water solutions with a duty of water curve around 2;
- the use of acidizing processes with the formation of humic acid separation from the liquid phase to the heavy phase—coagulated pulp;
- the use of "liquid-phase" mechanoactivation and dispersion of reaction components in extraction processes (chafing for prototype [22], adaptively optimized mechanoactivation that includes chafing and a dynamic shift with mechanical energy metering for the presented invention);
- the use of phase division processes in the centrifugal force field;
- the use of residual "water" in recycles;
- the use of the residual raw material for fuel briquette production.

The reasons impeding the technical result being obtained in comparison with the prototype—invention [22]:
- insufficient process flexibility not ensuring the width of the range of the marketable products being released (ballast organic and organomineral fertilizers in the form of suspended gels, ballastless humic and fulvic acid solutions and dry acids (fulvates) are not "represented");
- the lack of a liquid-phase oxidizing process increasing product yield.
- the lack of adaptively optimized mechanoactivation and the use of emulsification that ensure an increase in process effectiveness, including an increase in product yield and including the preparation of extra pure products without using alkalis and acids;
- the lack of the gravitational division of mixtures into components by density with the selection of these components from various levels to decrease the load on the mechanical phase division equipment;
- the lack of a vacuum drying process during the preparation of extra pure and deeply dried products prepared without using alkalis and acids;
- the lack of the use of the volatile substances contained in the feed stock for process heat generation;
- the lack of the use of the combustion heat of a certain part of the solid residual raw material for process heat generation.

Regarding the use of the mechanochemical reactor for the conversion of high viscosity media, including suspensions and pulps, as part of the presented invention, the invention [75] is known. In this invention designed for grinding solid materials in a liquid, the arrangement of the "classical" rod mill is used. The device contains a case, disk-like actuators installed in it with the possibility of opposite rotation that have impact elements and boosting blades located in concentric rows on their surfaces facing each other. The internal end-face of the case is toroidal in shape, and the tangentially located discharge sleeve is made in the form of a truncated cone and connected with the hydro-cyclone via a small hole. The authors believe this invention increases the effectiveness of grinding a solid material in a liquid with their subsequent separation.

Invention [75] shares the following significant features with the presented invention:
- the performance of the processes of grinding, activating and mixing various materials in liquid flowing media;
- the use of a general kinematic diagram in a design arrangement corresponding to the classical rod mill, [76].

The reasons impeding the technical result being obtained in comparison with the solutions for invention [75]:
- the inability to arrange the conversion of the reaction components of anomalously viscous flowing media due to the fact that no special design and process solutions are envisaged for it;
- the design solution of the device allows for the ingression of the media being converted through rotor axial holes into the space between the rotor and the case of the device, which may result in rotor drive overloads, the overheat of the structure and in the jamming of the rotor;
- the lack of the opportunity to introduce the second component in liquid form into the device for conversion, with intensive mixing of the components, disperse and mechanically activate them with their greater localized mass transfer;
- the lack of functionally connected regulated rotor drive speeds and the regulation of mass feed of components for conversion to ensure the optimization of the modes of this conversion and to prevent the device from switching to cavitation mode by controlling acoustic noises in the media being converted.

Invention [77], a disintegrator containing a case with inlet and outlet nozzles, two actuators in the form of counter-flow rotation disks where grinding elements facing each other are located in concentric rows, the rows of one disk located between those of the other one, is known. Moreover, a screw helping to grind source materials with any water content is introduced at the base of the inlet nozzle on the shaft of one of the disks.

Invention [77] shares the following significant features with the presented invention:
- the performance of the processes of grinding, activating and mixing various materials in media with large (any) water content;
- the use of a general kinematic diagram in a design arrangement corresponding to the classical rod mill, [76];

The reasons impeding the technical result being obtained in comparison with the solutions for invention [77]:
- inability to convert the reaction components of anomalously viscous flowing media due to the fact that no special design and process solutions are envisaged for it but for the screw providing for the work with materials with large water content rather than viscosity;
- the design solution allows for the ingression of the media being converted through rotor axial holes into the space between the rotor and the case of the device, which may result in rotor drive overloads, the overheat of the structure and in the jamming of the rotor;
- the lack of the opportunity to introduce the second component in liquid form into the disintegrator for conversion, with intensive mixing of the components, disperse and mechanically activate them with their greater localized mass transfer;
- the lack of functionally connected adjustable rotor drive speeds and the regulation of mass feed of components for conversion to ensure the optimization of the modes of this conversion and to prevent the disintegrator from switching to cavitation mode by controlling acoustic noises in the media being converted.

Invention [78], a disperser for emulsion preparation, is known. The device contains a cylindrical case with loading and off-loading sleeves, where rotors, on which multi-facet crushing elements and deflecting concentric rings are fastened, are located. The device is equipped with a chamber in the form of a taper lead fastened on the rotor on the side of the loading sleeve.

Invention [78] shares the following significant features with the presented invention:

the performance of the processes of conversion of reaction components in liquid form;
the use of a general kinematic diagram in a design arrangement corresponding to the classical rod mill, [76].

The reasons impeding the technical result being obtained in comparison with the solutions for invention [78]:

inability to convert the reaction components of anomalously viscous flowing media due to the fact that no special design and process solutions are envisaged for it;
the solution aimed towards the prevention of the ingression of the media being processed via rotor axial holes into the space between the rotor and the case of the device (the chamber in the form of a taper lead) is an attempt to solve the problem but does not fulfill this function reliably enough, as gaps "remain" for the potential ingression of the media being converted into the space between the rotor and the case of the device, which may result in rotor drive overloads, the overheat of the structure and in the jamming of the rotor;
the lack of the opportunity to introduce the second component in liquid form into the disperser for conversion, with intensive mixing of the components, disperse and mechanically activate them with their greater localized mass transfer;
the lack of functionally connected adjustable rotor drive speeds and the regulation of mass feed of components for conversion to ensure the optimization of the modes of this conversion and to prevent the device from switching to cavitation mode by controlling acoustic noises in the media being converted.

Invention [79], a rotor pulsation device that is designed for component mixing, dispersing, homogenizing, as well as liquid medium pasteurizing and sterilizing, as well as carrying out sonochemical reactions, is known. It contains a case where a rotor and stator with turbulizing elements on its surfaces facing each other are installed inside with a gap. The rotor is made of two parts with the opportunity of parting along the symmetry axis of the diametrical section in the rotation plane. Ring grooves form resonance volume on the adjacent sides of the joining planes. Brush seals are installed in the radial gap between the rotor and stator and the case. The turbulizing elements are made in the form of rings with radial slits. There are channels for the passage of the medium being processed to the rotor-stator radial zone far from the inlet of the device in the hub section of the rotor parallel to the rotation axis. An additional axial screw pump stage is installed on the rotor shaft on the side of the inlet sleeve.

Invention [79] shares the following significant features with the presented invention:

the performance of the processes of reaction component conversion in liquid form;
the use of a general kinematic diagram in a design arrangement corresponds relatively closely to the classical rod mill, [76], but only with one rotor (double dismembrator) [80, p. 58];
the design solution of the device ensuring the prevention of the ingression of the medium being converted into the space between the rotor and the case of the device;
the use of the axial screw pump stage (concentrically axial screws for the presented invention) to feed the medium being converted into the reaction chamber of the device.

The reasons impeding the technical result being obtained in comparison with the solutions for invention [79]:

inability to convert the reaction components of anomalously viscous flowing media due to the fact that no special design and process solutions are envisaged for it;
the solution aimed towards the prevention of the ingression of the medium being processed via rotor axial holes into the space between the rotor and the case of the device (the chamber in the form of a taper lead) is an attempt to solve the problem but does not fulfill this function reliably enough, as gaps "remain" for the potential ingression of the medium being converted into the space between the rotor and the case of the device, which may result in rotor drive overloads, the overheat of the structure and in the jamming of the rotor;
the lack of the opportunity to introduce the second component in liquid form into the disperser for conversion, with intensive mixing of the components, disperse and mechanically activate them with their greater localized mass transfer;
the lack of functionally connected adjustable rotor drive speeds and the regulation of mass feed of components for conversion to ensure the optimization of the modes of this conversion and to prevent the disperser from switching to cavitation mode by controlling acoustic noises in the medium being converted.

Invention [23] is known. Here a two-machine unit is used—a paddle (rod) disintegrator whose design is connected with the coal crusher via its inlet with screw feed and via its outlet with the mixer, also with a screw outlet. The disintegrator consists of two rotors (baskets) rotating in opposite directions and fitted on separate coaxial shafts. Rows of impact elements (paddles) are located on the rotor disks in concentric circles. The material subject to grinding is fed into the central section of the rotor and, while going to the periphery, is subjected to multiple impacts of the paddles rotating at a high speed in reverse directions, the internal bonds in the material being ground being broken.

Invention [23] shares the following significant features with the presented invention:

the use of a general kinematic diagram in the design arrangement of the disintegrator corresponds to the classical rod mill, [76];
the transportation of the medium being converted to the disintegrator and from it is carried out by means of screw drives.

The reasons impeding the technical result being obtained in comparison with the solutions for invention [23]:

the relatively low reliability of the potential conversion of the reaction components of anomalously viscous flowing media due to the fact that a limited number of design and process elements (only two screws) are provided for it;

the design solution of the disintegrator does not prevent the ingression of the medium being converted into the space between the rotor and the case of the device, which may result in rotor drive overloads, the overheat of the structure and in the jamming of the rotor;

the lack of the opportunity to introduce the second component in liquid form into the integrator for conversion, with intensive mixing of the components, disperse and mechanically activate them with their greater localized mass transfer;

the lack of functionally connected adjustable rotor drive speeds and the regulation of mass feed of components for conversion to ensure the optimization of the modes of this conversion and to prevent the device from switching to cavitation mode by controlling acoustic noises in the medium being converted.

Solution [81] is known. Here a disintegrator is used, where the medium being converted is fed in the axial direction (relative to the rotors), symmetrically on both sides, by means of screws with speed-regulated drives. The main motion drives are regulated as well. Mutually functionally dependent control (by means of a special controller) of the speeds of both groups of the drives takes place then in order to optimize the operation mode of the disintegrator based on the criterion of the quantity yield of volatile substances from coal resulting from its mechanodestruction. The design arrangement of the disintegrator precludes the ingression of the material being processed in the space between the rotors and the case of the disintegrator owing to the use of such devices as the valve hydraulic puller.

Invention [81] shares the following significant features with the presented invention:

the use of a general kinematic diagram in the design arrangement of the disintegrator corresponds to the classical rod mill, [76];

the transportation of the medium being converted to the disintegrator and from it is carried out by means of screw drives;

the design arrangement of the disintegrator precludes the ingression of the material being processed in the space between the rotors and the case of the disintegrator owing to the use of such devices as the valve hydraulic puller;

the opportunity to control the speeds of the rotor drives and material conversion feed drives, including the mutually functionally dependent control (by means of a special controller) of these speeds in order to optimize the operation mode of the disintegrator.

The reasons impeding the technical result being obtained in comparison with the solutions for invention [81]:

the relatively low reliability of the potential conversion of the reaction components of anomalously viscous flowing media due to the fact that a limited number of design and process elements (only two screws) are provided for it and there are no internal disintegrator cleaning devices;

the lack of the opportunity to introduce the second component in liquid form into the device for conversion, with intensive mixing of the components, disperse and mechanically activate them with their greater localized mass transfer;

the complexity and greater metal intensity of the electromechanical design of the disintegrator, including the need to use special electric motors with hollow rotors.

Solution [82], "WET CRUSHING DISINTEGRATOR", is known. This solution is the closest analog of the presented invention by inventive conception and is adopted as a PROTOTYPE.

This design solution belongs to devices for crushing, activating and mixing various materials with rotating impact ROD-TYPE ELEMENTS. Here the task of increasing the reliability of the operation of the disintegrator during the processing of moist materials, pastes, solutions and suspensions is solved with the prevention of jamming the crushing chamber with the medium being processed and the prevention of rotor jamming.

The wet crushing disintegrator contains a case forming a crushing chamber with loading and off-loading windows and with rotors installed inside it and equipped with impact rods and drives, whereas the crushing chamber is equipped with rotating brush-type cleaning devices located transversely to the rotor axis; moreover, the cleaning devices are equipped with their own drives having no mechanical connection with the rotor drives.

Prototype [82] shares the following features with the presented invention:

the performance of the processes of crushing, activating and mixing various materials in liquid flowing media;

the use of a general kinematic diagram in a design arrangement corresponding to the classical rod mill, [76];

the crushing chamber (mechanochemical reactor operating volume: according to the presented invention) is equipped with cleaning devices;

the cleaning devices are driven by their own autonomous drives having no mechanical connection with the rotor drives.

The reasons impeding the technical result being obtained in comparison with the solutions for prototype [82]:

a) the lack of reliability or inability to convert the reaction components of anomalously viscous flowing media due to the following reasons:

due to the fact that the crushing chamber is equipped with rotating brush-type cleaning devices located transversely to the rotor axis and according to their design arrangement in general, "dead" zones form in the crushing chamber (which is evident from the drawing) where incompletely reacted reaction components are accumulated, which may result in their "regular" discharge into the flow being processed, which results in the formation of chemically heterogeneous macro-fragments of the medium being converted at the outlet of the disintegrator;

a probable possibility (depending on the viscosity and adhesion properties of the compositions being converted and/or their non-Newtonian liquid-type properties) of the accumulation of the incompletely reacted reaction components in the brush volumes of the cleaning devices, which results in their "regular" discharge into the flow being processed, which results in the formation of chemically heterogeneous macro-fragments of the medium being converted at the outlet of the disintegrator;

b) the lack of design blocking for the ingression of the compositions being processed and affected by centrifugal forces into the space between the rotors and the case of the disintegrator, which may result in the jamming of the rotor during the processing of high viscosity media; a "classical" hydraulic puller is used for the presented invention;

c) the lack of design and process reinforcement for the operating rotor rods, their strength and operating resource (rod diameters are increased along with the peripheral withdrawal of the rods from the rotor rotation axes due to the inevitable increase in the loads affecting them in the presented invention);

d) the lack of a regulated metering feed drive of the flow of the medium being converted to the disintegrator, including a screw assembly with anti-adhesive surfaces;

e) the lack of space-oriented surfaces of hydraulic valve openings with pumping and reflecting properties, the design elements ensuring the advancement of the medium being converted with the change in its direction—from that of loading/feeding the medium being converted into the disintegrator to that towards the crushing chamber, parallel to the rotor rotation axis;

f) the low reliability of the feed of a high viscosity medium being converted into the disintegrator due to the lack of an active concentric two-screw channel for feeding the medium being converted horizontally—into the crushing chamber;

g) the lack of pump and screw blades ensuring the reliability of casting the flow of the medium being converted into the activation interaction zone of the rods;

h) the lack of the possibility of regulated (metered) feed of the second liquid component of the medium being converted into the disintegrator via an autonomous channel;

i) the lack of the opportunity for the functionally connected regulation of the main motion drives of the disintegrator/reactor (rotors) and the drives for feeding (metering the flows) the composition of the medium being converted into the disintegrator/reactor in order to ensure the adjustment of its operation modes;

j) the lack of control of the boundary of the potential shift of the disintegrator/reactor to cavitation mode by means of an acoustic sensor, which results in the lack of automatic stabilization of the operation mode in the sub-cavitation area;

k) the lack of fixed reflective and directing blades in the off-loading aperture of the disintegrator/reactor to ensure the reliability of the withdrawal of the medium being converted;

l) the lack of the anti-adhesive coatings of the internal surfaces of the off-loading aperture walls of the disintegrator/reactor and the reflective and directing blades installed in that aperture to ensure the reliability of the withdrawal of the medium being converted;

m) the lack of vibrational effect of the off-loading aperture walls of the disintegrator/reactor and of the fixed reflective and directing blades installed in that aperture on the medium being converted and withdrawn to ensure the reliability of the withdrawal of the medium being converted.

DISCLOSURE OF INVENTION

HUMINS are not water-soluble at any pH value and hence not soluble under alkaline or acid conditions. The chemical and physical properties of humins have only been partially discovered. The HUMINS present in the soil are the most decomposition-resistant of all humic substances. The basic functions of humins in the soil include their water-retaining capacity, improving the soil structure, maintaining the stability of the soil, functioning in the cation exchange system and improving the fertility of the soil in general. Thus, HUMIN is the key component of fertile soil [31].

HUMIC ACIDS are a mixture of low concentration, fatty and aromatic acids. They are insoluble in water with a low pH, but are soluble in water with a high pH. HUMIC ACIDS are a part of the humic substances that are sedimented in a water solution if the pH level drops below 2 [31]. FULVIC ACIDS are a mixture of low concentration, fatty and aromatic organic acids which are water-soluble under any conditions (acid, neutral, alkaline).

FULVIC ACIDS have relatively small molecular weights and thus penetrate the roots, stalks and leaves of plants well. As they penetrate, FULVIC ACIDS carry micronutrients from the surfaces of the plants and into their tissues. If applied to foliage, a FULVIC ACID transports micronutrients right into the metabolic centers of the plant cells.

FULVIC ACIDS are compatible with plants and not toxic when used at relatively low concentrations [31].

THE TASK OF THE SUPPOSED METHOD IS TO EXPAND THE FUNCTIONAL CAPABILITIES OF THE KNOWN METHODS, TO CREATE A HIGHLY EFFECTIVE, FLEXIBLE PROCESS FOR MANUFACTURING VARIOUS PRODUCTS—organic and organomineral humic fertilizers and biologically active humic preparations, fulvates and fuel briquettes based on widely available raw materials—coal series caustobioliths, including leonardite. Leonardite is the richest raw material for humic preparation production, as its humic (protohumic) substance content reaches 90% [32].

Of greatest value for fertilizer production are, as a rule, low-quality coals, which are extracted using the open-pit method, the most economical one, in many cases. Using the open-pit method, weathered power-generating coals of reduced quality are extracted. These coals are of great value for obtaining organomineral fertilizers and plant growth stimulants. High water and ash content are not an obstacle for using coals in agriculture; their high water content eliminates the need to moisturize coals during fertilizer production, whereas the mineral part contains micronutrients (boron, manganese, zinc etc.) necessary for normal plant growth [27].

A certain group difference in processes based on the criterion of the numerical value of duty of water curve is observed during an overview of the recovery processes of humic fertilizers and preparations. It can be characterized with three groups:

conventionally dry processes in which the water content of the basic organic raw material amounts to tens of percents—duty of water curve: 0.1 to 0.8. Furthermore, the complete dissolution of the extractants in the moisture of the raw material is accompanied by relatively long mixing or leaving the mixtures in a calm state for a very long time; for instance, when a biologically active humic preparation is being obtained in invention [33], a viscous and flowing paste with the "optimized" duty of water curve of 0.67 is being converted;

the processes "accompanied" by duty of water curve values between 5 and 13, as it is, for instance, used in [12]. In this case, extraction processes are ensured by intensive agitation or hydrodynamic processing of mixtures with relatively high energies, which implies mechanoactivation;

processes with duty of water curve values between 25 and 200 [29]; in this case, very much residual "water" is obtained with obvious problems concerning its disposal, as this "water" is actually a solution containing the neutralization products of alkalis and acids—mineral salt solutions [48]; a lot of known processes of obtaining useful humic substances are aimed first and foremost at the increase in the yield of the basic product, whereas environmental products are actually of little concern there despite the fact that the volume of waste "waters" resulting from the processes of obtaining HAs from brown coals is 2 to 25 times larger than that of the finished product [48].

During the development of the presented invention, whose aim is to create a group of comprehensive-use inventions with a wide product range, such a differential feature of the processes as the criterion of the DUTY OF WATER CURVE number seems to be important. It is obvious for a designer-technician that the numerical value of duty of water curve somehow directs the choice towards some physical-chemical functionality of the units the process equipment complex will be composed of or other in a rather prescriptive way.

According to this criterion, the concept of mechanoactivational conversion of raw material reaction components with the duty of water curve preferentially ranging between 1 and 2 is used in this invention.

Thus, the objectives of the presented invention include the decrease in the volumes of the water used with the minimum power intensity of the technological processes and the minimum reagent consumption, as well as an increase in the quality of the products obtained within a relatively wide product range.

The first "classical" process of obtaining humic growth stimulants is described in [5, p. 163, 164]. Dried milled coal is mixed with sodium hydroxide water solution. The mixture is agitated for a certain time at a set temperature and then divided into solid and liquid phases. The solid phase is the non-dissolved residual coal, whereas the liquid one is an alkaline humate solution. The humate solution is dried, and solid humates are obtained. The solid residue is a waste product and can be sent for burning or used in other directions. The boiling-down distillate can be used to prepare the alkali solution again or dumped into the sewerage.

The widespread "classical" processes of obtaining growth biostimulants from organic raw material include the stage of raw material milling, mixing it with water, adding an acid medium, dwelling, partial removal of moisture, adding the alkaline medium and concentration. However, the physical parameters of the process at some stages are such that the pressure (up to several MPa) and temperatures (over 100° C.) destroy a significant part of the biologically active substances present in the raw material, such as amino acids, enzymes, hormone-like substances, vitamins etc. Furthermore, the maximum resulting humate concentration in the solution is 2%, which implies the need to evaporate up to 80-85% of the moisture, i.e. leads to significant power consumption [26]. It is also necessary to use temperatures exceeding 100° C. while implementing the widespread "classical" processes, which leads to the destruction of a number of biologically active substances [26], while the path of the "classical" increase in pH to 12 leads to significant alkali consumption. Experimental data on decreasing HA yield by 4 to 5 times due to an increase in temperature from 50 to 100° C. to 200° C. at the same extraction process parameters are presented in [5, c. 33].

Accordingly, to obtain high-quality commercial products that are obtained from fossil organic raw material, it is necessary to decrease the raw material conversion temperature, i.e. exclude boiling; it is practicable then not to increase the concentration of the alkalis used, practicable to decrease the quantity of the water used and also beneficial to use water in process recycles.

Accordingly, to prevent the thermal destruction of the HAs and the fulvic acids (FAs) in the presented invention, vacuum evaporation is carried out in the units, using the minimum temperature drop, e.g. in devices similar to those represented in Russian inventions [34, 35].

Coal oxidation is an undesirable process from the perspective of power engineers and coke chemists. However, when brown coals are oxidized with various oxidizers—nitric acid, hydrogen peroxide, oxygen or air—under pressure in an alkaline medium, mixtures of organic acids ranging from high-molecular humic and water-soluble polycyclic ones to low-molecular fatty (formic, acetic, oxalic, amber, adipic) and aromatic (benzoic, isomeric phthalic and polybasic benzocarboxylic) ones are obtained. The properties of coal during oxidation change in various directions. The change in coal weight during oxidation is associated with the effect of oxygen on it. In this case, oxygen molecules are bound into complexes with macromolecules forming the substance of coal, while the weight loss observed results from the emission of the amounts of carbon monoxide and dioxide, water vapors and ammonia exceeding the amount of the oxygen absorbed [27]. The fact that volatile substance yield changes and a certain amount of humic acids is formed due to coal oxidation is also mentioned there. Oxidation lets transfer up to 50% of the carbon of the coal into water-soluble acids and almost all of the oxygen—into humic acids [27, p. 222]. By-products include both the gases mentioned above and water and mineral substances which can be used in some way or other.

For instance, there is a process of active coal oxidation with oxygen or air in a pseudo-liquefied layer reactor presented in American invention [36] as humic acid production. According to Australian invention [37], plant humus-containing raw material is also oxidized with air while being actively agitated at a duty of water curve under 1 before being subjected to water extraction. In inventions [38, 39] and in the proceedings of conference [40], an amount of hydrogen peroxide equal to 2.5 to 20% of the mass of absolutely dry raw material is used along with alkali to obtain oxyhumates, or a protective preparation for plants from peat.

Due to the effect of the above factor of fossil organic substance oxidation, the process of liquid-phase oxidation with hydrogen peroxide is used in the presented invention.

The task set is solved in the method of comprehensive conversion of brown coals to humic fertilizers and preparations according to the presented invention by the use of a Flexible Process Flow Diagram (FPFD) whose structure ensures the production of a range of marketable products represented by the following composition:

the production of ballast organic fertilizers (suspended gels);

the production of ballast organomineral fertilizers (suspended gels);

the production of humic biologically active preparations (ballastless solutions of humic acid compositions of various concentrations and with various minimum residual composition of solid fractions by size);

the production of fulvic acids—highly biologically active preparations (ballastless solutions of various concentrations and with various minimum residual composition of solid fractions by size);

the production of humic biologically active preparations (ballastless dry humic acid salts);

the production of fulvic acids—highly biologically active preparations (ballastless dry fulvic acid salts—fulvates);

the production of fuel briquettes.

The task set is completed by means of the fact that the process flow diagram according to the presented invention has enough flexibility to produce the above composition of the product range on the one hand, and that the minimum amount of equipment is used in the flow diagram owing to the property of flexibility on the other hand. It is understood then that the configuration of material flows in the process flow diagram can be changed promptly depending on the needs of the production of some product or other.

The concept of the FPFD presented in this invention implies not only the flexibility mentioned above, but also adaptability regarding the types and parameters of raw material, i.e. the optimization of process operating procedures is ensured while various types of raw material—coal series caustobioliths—are used. At the same time, process operating procedures can be optimized for the same type of raw material, e.g. leonardites submitted for conversion from various deposits under various conditions of their transportation and warehouse storage, which results in their characteristics being different.

In accordance with the inventive conception, optimization is represented by THREE CATEGORIES OF PROCESSES:
- organizational and analytical processes—covering the production preparation associated with the choice of raw material, the choice of the marketable product range composition for the planned operation period of the process unit, the logistic and other resource support of the course of production;
- program and parameter processes—covering the production preparation associated with the characteristics of the raw material and the required characteristics of the products, including process calculations and experiments based on whose results process operating procedures for the planned operation period of the works are developed;
- start-up and commissioning processes—relevant instructions on the control of technological processes are "introduced" and electronic control software for the equipment is "introduced" to workplaces in accordance with process operating procedures.

Functional mutual dependences of technological process parameters and mutual dependences, e.g. those specified in inventions [21, 22, 29], can be used for the latter two categories:
- increase in the duty of water curve used lowers the intensity of the requirements for the equipment but decreases the humic acid yield [29] and increases the power consumption with a view to increasing product concentration; a similar dependence is specified in [21] as well;
- depending on the time of reaction component conversion, humic acid yield has the form of an extremum function [29]; similar data are presented in [21] as well;
- humic acid yield increases during brown coal conversion due to the relative increase in the number of its particles with a fine fraction composition [22];
- increase in the reaction component conversion temperature above 60 to 80° C. decreases humic acid yield [29];
- humic acid yield during extraction processes is the largest if sodium hydroxide, potassium hydroxide or ammoniacal liquor is used in comparison with other extractants, e.g. lithium hydroxide [29];
- as the concentrations of water solutions with such reagents as ammonia and hydrogen peroxide increase, water-soluble organic substance yield increases [21]; a similar dependence for potassium hydroxide is given in [22];
- while the suspensions being converted are divided into solid and liquid phases in the centrifugal force field (by centrifuging/decantation), humic acid losses increase due to their residual content in the solid phase if the amount of the solution decreases below 0.5 of the amount of coal, whereas an increase in the amount of the solution above 2.0 results in no significant decrease of losses [22].

All manners of functional and process mutual dependences go beyond these examples which merely illustrate the possibility of programming functional and process variations in the presented invention.

The possibility of the reaction of humic acid salts with calcium, magnesium and iron ions contained in hard water is taken into account in the proposed invention. Due to this fact, the invention provides for the existence of a water treatment system with which water from an external source is purified and subjected to electrochemical softening. The parameters of the prepared water corresponding to the processes of production, for instance, humic acid water-soluble salts from [41] are as follows: total iron—0.05 mg/l max., total hardness—0.3 mg-equ/L max.

Mechanoactivation and mechanochemical activation are used to the maximum extent in the presented invention with a view to ensuring high humic product yield and so as to intensify technological processes in general.

For instance, according to the data from [49], total HA yield increases by 1.63 times after mechanical activation; free HA yield is increased by 1.9 times. After mechanochemical activation, total HA yield increases by 2.13 times, and free HA yield—by 2.5 times. A similar trend of the effect of mechanoactivation is represented in peat conversion [50]; it is shown here that the mechanoactivation of peats increases HA yield by 6 to 7 times.

During mechanoactivation with reagents (mechanochemical activation) a structural rearrangement resulting in the change of certain fragments of macromolecules and the number of functional groups included in the HAs occurs [51], the number of hydrophilic fragments in them increasing, which results in an increase in the solubility of humic preparations.

Adaptively optimized mechanoactivational effect on the reaction components being converted applied in the presented invention ensures the possibility of a decrease in the concentration of the alkali used to 0.5 or 1.0% with a COMPLETE OMISSION of its use also possible. This decreases alkali consumption during production and allows obtaining humic acids with pH=5 to 6, which is closer to their neutral values. And, according to the data from [23], this allows using the humic products obtained in medicine, perfumery and cosmetics. If using alkali (at least a minimum amount) is necessary to produce pure preparations, SODIUM PYROPHOSPHATE, which withdraws humic substances almost completely and at considerably low temperatures (20 to 40° C.), is used, which contributes to unchangeable and non-oxidized HAs with good quality characteristics which, according to [52], are recommended for medical preparation production and, consequently, for animal husbandry, poultry farming and fish farming, being obtained. Due to this fact, physical water treatment to increase pH from 7 or 7.4 to 8.45 to 9 is used in the presented invention in advance before the processes of the conversion of water composition raw material mixtures into products.

Such effective processes of increasing the pH value of water are known from inventions [42, 43, 44]. Here, hydrodynamic cavitation, owing to which water molecules split to form hydrogen ions and OH hydroxyl groups, is used during water treatment. In this case, beside the OH group and atomic hydrogen, part of which abandons water, HO2 free radicals also form, and "useful" hydrogen peroxide forms as a result of their recombination [44].

The directions of perfection of the widely used processes of obtaining growth biostimulants from fossil organic raw material seem to include ИЗ the path of the improvement of mechanoactivation processes. In accordance with the inventive conception, this path is based on original and rare process parameters with which extremely high performance characteristics are achieved, namely LOW-FREQUENCY and INFRASONIC exposure of reaction components [18, 19], as well as high shift speeds in liquid reaction mixtures [26].

The transition of humates to a solution occurs according to a diffusion mechanism, and significant intensification of the process of humic acid extraction withdrawal is achieved by means of exposure of the boundary layer and the solid phase particles to LOW-FREQUENCY ACOUSTIC VIBRATIONS [19].

The process called ADAPTIVELY OPTIMIZED MECHANOACTIVATION is new in this presented invention in terms of perfection of the functional use of low-frequency sound and infrasonic exposures of reaction mixtures and the use of high shift speeds in mixtures. This process ensures the modes of reaction component "high-energy mixing" with automatic maintenance of parameters in the sub-cavitation area regardless of the drift of all the remaining basic parameters at a minimum duty of water curve of 0.9.

In accordance with the inventive convention, such technological solution as the use of high shift speeds in reaction compositions with ADAPTIVELY OPTIMIZED MECHANOACTIVATION is used in the presented invention, which allows ensuring the process control of the parameters of the reaction compositions being converted throughout their conversion, as it is similarly done according to invention [20]. However, the reference to invention [20] does not imply the possibility of opposing it to the proposed invention but merely points at the correct direction of further perfection of the known processes.

The phenomenon of cavitation is used in many inventions where extraction processes are necessary, e.g. in invention [20]. It is specified there: "The use of the ultrasound cavitation process allows carrying out extraction processes at low temperatures (as low as room temperatures) and low pressures (as low as the atmospheric pressure)." It is, nevertheless, obvious that these temperatures and pressure are relevant for time intervals longer by far than the periods of the ultrasonic vibrations mentioned above. The problem consists in the fact that it is not the case in localized areas of the mixtures being converted and at very short time intervals. And this is a problem of the existence of mechanodestruction and thermal destruction along with those useful effects of cavitation in the mixture conversion processes.

If cavitation bubbles are collapsed, the temperature in them rises to as much as 10000° C., the pressure amounting to 100 to 1000 MPa [8, 43]. However, the key hazard of localized thermal-impact and hydraulic-impact destruction of humic substances exists not in the cavitation bubbles themselves, but in the liquid medium near these bubbles. For instance, it is established experimentally according to the data from [44] that the temperature in a material near a collapsing bubble rises by 500 to 600° C., the emerging shock waves reaching values as high as 400 MPa in the liquid surrounding the bubble.

Due to this fact, to exclude hydraulic-impact mechanodestruction and to exclude localized thermal destructions, the processes of ADAPTIVELY OPTIMIZED MECHANOACTIVATION AND/OR MECHANOCHEMICAL ACTIVATION are used in the proposed invention with dynamic exposures of the media being converted within the sonic and infrasonic frequency range, as it is done in [18, 19], and with shift speed static components ranging from several to tens of meters per second, as it is done according to invention [26].

The objectives of the presented invention include ensuring the stabilization of metered introduction of mechanoactivation energy into the reaction medium being converted, which is necessary to maintain the optimal process parameters in the media being converted. It also seems practicable here, which is in line with the inventive conception, to provide the opportunity to introduce the maximum amount of mechanical energy into the media being converted while having an opportunity for a special limit precluding the "fall" of mechanochemical reactors into cavitation modes and ensuring their operation in sub-cavitation areas.

According to the presented invention, the automatic regulation of the introduction of mechanoactivation energy into the reaction medium being converted with a view to maintaining the operation of mechanochemical reactors in sub-cavitation areas regardless of the characteristics of the media being converted and regardless of the drift of these characteristics is done on the basis of the known methods of control of vertical fuel incinerators using their acoustic fields [45].

A "similar" solution having to do with the stabilization of the operation of, e.g., cavitators, is known from [47]. However, the solution proposed here and based on the characteristics of the power entering the electric motor reflects the correlation between power and actual hydrodynamic processes in reactors quite modestly, i.e. the information transfer function proposed in [47] does not in any way reflect the transfer functions of the electrical engineering of the electric drive motors, let alone the transformers regulating their operations and forming harmonics by means of impulse modes during operation themselves.

Due to this fact, it seems that cavitation noises are very easily recorded with sound sensors, and the task of control of mechanochemical reactor drives boils down merely to the smooth decrease in drive speeds to the point of the disappearance of cavitation noises.

In accordance with the inventive conception, acoustic information is collected by means of acoustic probes, whose designed location is in the cases of mechanochemical reactors and units, and based on this information, the main drives of these reactors and units are controlled by means of controllers, e.g. according to algorithms from [46].

Due to the possibility of maneuvering in terms of raw material and due to the relative width of the marketable product range, THE SIGNIFICANT ATTRIBUTES OF THE FPFD USED include:

a) the use of various raw materials from among coal series caustobioliths represented by coals, including leonardite, peat and oil shales [30];

b) the preliminary milling of the raw material to 0 . . . 3 mm grade;

c) the preliminary purification and electrochemical softening of the water replenished from an external water supply system;

d) the opportunity to redirect the material flows of the reagent compositions being converted for various equipment, thus organizing process loops in the FPFD for the production of some product or other;

e) the preferable conversion of the raw material in continuous flows;

f) the opportunity to use (apply or not apply) oxidizers, alkaline extractants, acids and FLOCCULANTS in raw material conversion processes, technologically applying them by means of the relevant hardware modules—by including some module or other in a process loop oriented towards the production of a specific product:

preliminary liquid-phase or gas-liquid oxidation of the raw material, e.g. through oxygen barbotage or with hydrogen peroxide;

alternate opportunities—extraction by means of sodium or potassium hydroxides and by means of sodium of potassium pyrophosphates or without chemical reagents by correcting the pH of the water using physical methods [42, 43, 44];

acidification of the compositions being converted with the formation of the recovery of the HAs from the liquid phase to the heavy—gel-like and coagulated—phase, including the use of orthophosphoric acid to obtain products whose quality allows using them for medical and animal husbandry purposes;

the opportunity to add mineral fertilizers and/or micronutrients to the products.

g) mechanical division of suspensions into solid and liquid phases in the centrifugal force field;

h) the process of fine filtration to obtain liquid, high-quality products with an extremely low content of ballast substances;

i) vacuum, low-temperature solution drying with the minimum thermal charge and after their activation emulsification in the pre-cavitation parameter area with a view to obtaining high-quality products;

j) the use of liquid-phase ADAPTIVELY OPTIMIZED MECHANOACTIVATION AND/OR MECHANOCHEMICAL ACTIVATION with the duty of water curve ranging from 0.9 to 2.5 and with reaction composition dispersion by chafing and a dynamic shift of the layers of the medium being converted with the static components of the shift speeds ranging between several and tens of meters per second; with the metered introduction of mechanical energy into this medium and stabilization of that metering regardless of the drift of all the other parameters in this medium being converted; in this case, the chafing and shift processes mentioned above are formed by means of static and dynamic characteristics; for instance, dynamic—hydraulic impulse—exposure of the medium being converted is done within the varying frequency range from infrasound to the frequencies bordering on ultrasound, while the conversion mentioned is also carried out in time starting with higher frequencies; at the same time, automatic maintenance of the maximum parameters of the introduction of mechanical energy into the medium being converted is ensured using the means of metrology, as well as the means of control electronics and electric engineering, while automatically limiting the energy in the sub-cavitation area to prevent the "fall" of mechano-chemical reactors into cavitation modes.

k) the opportunity of gravitational division of the mixtures into components by density with the selection of these components from various levels during ballast fertilizer production and to ease the operation modes of mechanical phase division units;

l) the use of water recycles—the recovery of discharge "water";

m) the use of the desalination processes of discharge "water" (solutions being "products" of alkali and acid neutralization by means of reverse osmosis, moisture evaporation and crystallization) with the output of additional products—various salts of commercial conditions;

n) discharge of volatile substances from raw material components during reaction composition conversion by means of mechanical activation and mechanochemical activation with further use of the combustible part of these volatile substances to generate process heat, e.g. during vacuum drying, and during semi-coking and fuel briquette shaping;

o) the use of a certain part of the fuel briquettes produced to generate process heat.

A "classical" process of briquetting brown coals with a view to semi-coking them is known from [27, p. 198]. The essence of this process boils down to milling the coal to 0 . . . 1 mm grade, drying it with hot gas to a water content ranging from 8% to 10% and subsequently forming briquettes with approximately 200 MPa of pressure and cooling with inert gas. The briquetting process effectiveness is higher in the presented invention owing to a new engineering solution: a part of the heat energy necessary for semi-coking and briquette forming is obtained by burning the volatile substances obtained during the processing of reaction compositions while preparing humic and fulvic products.

Furthermore, a known [69] solution is used in the process of the proposed invention regarding fuel briquette preparation: a part of the fuel briquettes obtained is burned in order to recover heat energy and use it to heat the heat carrier with which the thermal power elements of the screw extruder contacting the material being formed are heated.

In accordance with the presented invention, the process of fuel briquette preparation is carried out in a screw extruder using the method of THERMAL CONTACT SEMI-COKING.

In general, it is known from [27, p. 197] that the semi-coking process usually consists in the even warm-up of the coal dose to a temperature ranging from 500 to 550° C. with no access of air, and the steam-gas mixture of the substances to have discharged is drained during the recovery of semi-coke. According to the presented invention, the combustible part of these volatile substances is burned while recovering a part of the process heat necessary. In this case, the "warming" temperature of the heat-carrier amounts to as much as 650° C. according to the data from [70] for the semi-coking process, and these data are used in the invention. The idea of using hot gases as a warming heat carrier is also "expressed" in the Russian solution [71], where an energy-and-process complex with a biopellet torrefactor is shown. These data are given here for a more complete understanding of the solutions used in the proposed invention and cannot be actually opposed to it.

Various known better engineering solutions united in this invention are taken as the basis of the structure of a heated and power shaping (for fuel briquettes) extruder. For instance, the brand new solution shown in [72] can be used regarding the power mechanics of briquette shaping. The capabilities of the thermal contact of driven and material-driving design elements are also represented by new inventions [73 and 74]. The capabilities of heating not only the case of the extruder itself, but also its screw are also shown here.

As a result of the conversion of the mechanical energy of the extruder's actuators into heat energy owing to the internal friction in the shaped material itself and owing to additional heating of the case and the screw, due to the supply of heat to them by means of hot gases, a comprehensive effect on the material being converted, mechanical and thermal, is obtained, which ensures the high performance of the equipment and the acceptable quality of the product.

Semi-coke is the basic product of the semi-coking of brown coals (including leonardite). Due to its easy flammability, high reaction capacity and smokeless combustion, semi-coke tends to be used in households, for gasification and as a chemical reagent [27, p. 203].

THE TASK OF THE PRESENTED INVENTION is also the need to offer a new converting unit—A MECHANOCHEMICAL REACTOR FOR THE CONVERSION OF HIGH VISCOSITY MEDIA, including suspensions and pulps, —as part of a group of inventions for use in the process equipment complex.

Here, due to the peculiarities of the processes in the presented invention described above, the key engineering requirements to the mechanochemical reactor for the conversion of high viscosity media are as follows:

a) the conversion of the reaction components of brown coal suspensions, including leonardite, is carried out at a duty of water curve ranging from 0.9 to 2 and during the manufacturing of ballast humic fertilizers with mostly 0.9 to 1.1.

b) the conversion of high viscosity media, which is also associated with small duty of water curve values:

it has been experimentally established that the "conventional initial" viscosity of the brown coal suspension being converted in the "presented" mechanochemical reactor is 1.38 Pa×s and grows as it is converted, and up to 10 to 40 MJ/m3 of energy is introduced, at the maximum process temperature used according to the presented invention, 60° C.

it is known [8, p. 100] that the growth of viscosity in liquids occurs with the increase in pressure, which, according to the presented invention, takes place due to dynamic hydraulic impulse effect on the reaction compositions.

it is also known [8, p. 100] that the viscosity of organic acids grows as their molecular weight grows, especially in disperse systems, when microparticle or macromolecule cohesion occurs, which is completely true of caustobiolith raw material and humic substances.

c) reaction composition conversion is carried out not only by means of relatively large mass transfer, but also owing to the dynamic hydraulic impulse effect on these reaction compositions:

with a varying frequency within the range of 3200 to 16 Hz, over the time of 4 to 6 seconds, over the time of the passage of the reaction composition REACTOR DOSE through the reactor;

shift speeds are changed from 100 to 0.5 meters per second over the time of 4 to 6 seconds, over the time of the passage of the reaction composition REACTOR DOSE through the reactor;

in view of the above parameters, such parameter as the "average" (dynamic and static) pressure is a numerically free parameter if the energy of reaction composition mechanical activation is 5 to 40 MJ/m3.

d) reaction composition conversion with observance of the parameters specified in the above clauses a), b), c) is carried out in the ADAPTIVELY OPTIMIZED MECHANOACTIVATION mode through automatic maintenance of these parameters with them being limited in the sub-cavitation area regardless of the drift of all the other parameters of the mechanochemical reactor.

As far as designing the reactor regarding the hydraulic impulse effect on reaction compositions and the effect of shift speeds on them is concerned, it is practicable to use the following formula:

$$f=(n \times N)/30$$

where: f is the frequency of the hydraulic impulse effect on reaction compositions;

n is the controlled parameter, the number of rotor disk rotations per minute;

N is the number of operating rods on the circumference of the rotor disks.

Thus, the highly detailed task of the presented invention is to build a complex of design and process solutions ensuring the above engineering requirements for a mechanochemical reactor.

THE SIGNIFICANT ATTRIBUTES OF THE PRESENTED STRUCTURE OF THE MECHANOCHEMICAL REACTOR ARE:

the performance of the processes of material milling, mixing and activation in the form of anomalously viscous liquid and flowing media;

the use of a general kinematic chain in a design arrangement corresponding to the classical rod mill, [76];

the operating volume of the reaction area of the mechanochemical reactor is equipped with cleaning devices—rotating cleaning mini-rotors with cleaning rods installed on them;

cleaning mini-rotors are driven by their own autonomous drives having no mechanical connection with the drives of the rotors;

to block the undesirable possibility of the ingression of the materials being converted under the influence of centrifugal forces into the space between the rotors and the disintegrator case, which may lead to rotor jamming during the conversion of high viscosity media, the "classical" hydraulic puller is used; whereas to prevent the ingression of the materials being converted into this space from the side of the rotor radial periphery, mini-screw, single-turn threads which actively reflect the materials being converted from the gaps between the rotor disks and the internal "cylindrical" surface of the reactor case while the rotors rotate are made on the cylindrical surfaces of the rotor disks;

the design and process reinforcement of the rods of the operating rotors, their strength and operating resource along with the peripheral withdrawal/placement of the rods from the rotor rotation axis, the rod diameters increased, due to the inevitable increase in the loads affecting them;

during the hydraulic impulse effect on the medium being converted, with a view to precluding the formation of harmonics above the first one, with significant amplitudes—for this hydraulic impulse effect to be effective, an equal number of rods is used in each circular row of rotors, while their geometry (not conflicting with the rod reinforcement mentioned above) is calculated according to the data presented in invention [83];

the spatially oriented surfaces of hydraulic valve gaps, with pumping and reflecting properties, are the design elements ensuring the advance of the medium being converted with a change in its direction—from the direction in which the medium being converted is loaded/fed into the reactor to the direction towards its reaction chamber, parallel to the rotor rotation axis;

the medium being converted is fed into the reaction area (in horizontal direction) with concentrically placed (one inside the other) screws for the active feed of the high viscosity medium being converted;

the existence of pump and screw blades ensuring the reliability of casting the flow of the medium being converted into the activation interaction zone of the rods, as it is, for instance, done in invention [84];

if the conversion of special anomalously viscous, slow-flowing compositions, e.g. with a duty of water curve ranging from 0.5 to 0.9, is necessary, an application without rod rotors is possible—one with radial-wave surfaces, as it is shown with regard to the dismembrator represented in invention [85];

the opportunity of pump metered (adjustable) feed of the second liquid component of the medium being converted into the reactor via an autonomous channel;

the existence of a regulated drive for feeding/metering the flow of the medium being converted into the reactor by means of a screw assembly with anti-adhesive surfaces among other things;

autonomous regulation of the speeds of the main motion drives of the reactor—for each rotor regardless of what ensures the shift speed range of the compositions being converted and the amplitude-frequency range of the hydrodynamic impulse effect on these compositions being converted;

the opportunity of the functionally connected regulation of the speeds of the main motion drives (rotors) of the reactor and the drives to feed (meter the flows of) the composition of the medium being converted into the reactor to ensure the adjustment of its operation modes and to maintain these modes during production;

parameter control of the boundary of the potential shift of the reactor to cavitation mode by means of an acoustic sensor, which result in an opportunity to ensure the automatic stabilization of the operation modes of the reactor in the sub-cavitation area;

fixed reflective and directing blades in the off-loading aperture of the reactor to ensure the reliability of the withdrawal of the high viscosity medium being converted from the reactor;

the anti-adhesive coatings of the internal surfaces of the off-loading aperture walls of the reactor and the reflective and directing blades installed in that aperture to ensure the reliability of the withdrawal of the high viscosity medium being converted from the reactor;

the vibrational effect of the off-loading aperture walls of the reactor and of the fixed reflective and directing blades installed in that aperture on the medium being converted and withdrawn to ensure the reliability of the withdrawal of the high viscosity medium being converted from the reactor.

Thus, the necessary functionality of the mechanochemical reactor is achieved through the use of the attributes specified above, some of which were known before from the sources specified above, and some of which are new; however, their combination and joint use allows solving a topical and still unsolved problem—building a MECHANOCHEMICAL REACTOR FOR THE CONVERSION OF HIGH VISCOSITY MEDIA, including suspensions and pulps. At the same time, metered introduction of mechanoactivation energy into these media being converted with the variation of its mutually dependent parameters, such as time, dynamic and static powers, shift speeds, frequency and pressure, is ensured in the reactor.

BRIEF DESCRIPTION OF THE DRAWINGS

The invention is explained with a structural process flow diagram and drafts of the design arrangements of the basic equipment.

PREFERRED EMBODIMENT OF THE INVENTION

Figure 1:
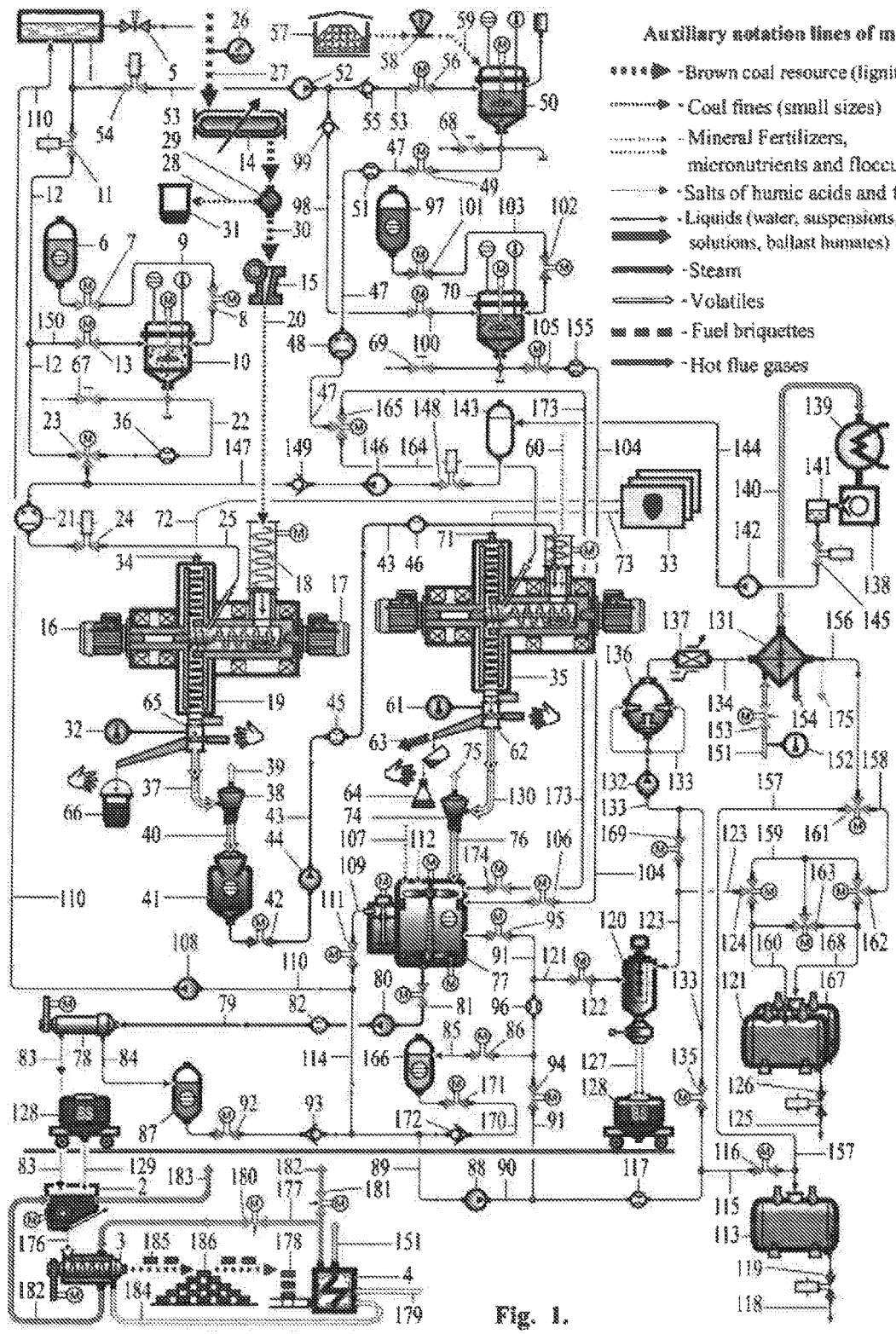
FIG. 1. The structural process flow diagram of technological processes with software-controlled kinetics of mechanoactivation and mechanochemical activation during the preparation of humic fertilizers, physiologically active salt preparations and fuel briquettes.

The embodiment of the invention based on the method of comprehensive conversion of coal series caustobioliths, mostly brown coals and leonardite, into humic organic and organomineral fertilizers and into preparations with the recovery of salts and fuel briquettes is illustrated by the process flow diagram in FIG. 1. THREE SYSTEMS ARE REPRESENTED structurally in this flow diagram: the water treatment and desalination system 1, the fuel briquette preparation and process heat generation system is represented by heat dryer 2, screw extruder 33 and boiler 4, and the PROCESS SYSTEM of comprehensive COAL SERIES CAUSTOBIOLITH CONVERSION itself is represented in detail.

According to the presented method, THE MANUFACTURING PROCESS OF BALLAST ORGANIC or ORGANOMINERAL FERTILIZERS as a product in the form of suspended gels is performed as follows.

Water treatment and desalination system 1 is fed with water through damper 5 from an external water supply system. Based on the performance of the physical and chemical assays of the incoming water, it is treated and softened if necessary. Then, depending on the commercial requirements for the product, cavitation processing of the water may take place [42, 43, 44] with a view to raising its pH from 7 to 7.4 to 8.45 to 9 owing to the saturation of the water with OH— hydroxide ions. In this case, HAs are extracted without adding alkalis, as, if the OH— ion content in the water is over 10-7 mole/liter, it is an alkaline solution.

However, in this case, to increase the HA yield, it is necessary to process the raw material, e.g. leonardite, before the "leaching" with a 3 to 5% hydrogen peroxide solution. While this is carried out, hydrogen peroxide concentrate is metered from reservoir 6, through valves 7 and 8, via line 9 to mixer 10, and the dose of treated water is transferred from system 1 through valve 11 and via line 12 to mixer 10 by means of regulating valve 13, whereupon mixer agitator 10 is started for 10 to 15 seconds. When the hydrogen peroxide solution is ready, raw material meter 14, crusher 15, main drives 16, 17 and feeding drive 18 of mechanochemical reactor 19 are started. The moment of the ingression of ground leonardite 20 into feeding drive 18 is recorded by means of sensors (not shown), and the feed of hydrogen peroxide solution into mechanochemical reactor 19 from mixer 10 is started at once by means of metering pump 21 via line 22, through valve 23 and valve 24 via line 25. In this case, the speeds of feeding the reaction components into mechanochemical reactor 19 are calculated in advance based on the indications of raw material 27 water content sensor 26. At the same time, potential metal inclusions 28 are separated from raw material 27 for the faultless operation of the equipment using magnetic separator 29, and "purified" leonardite 30 enters grinder 15, whereas potential metal inclusions 28 are collected in bowl 31.

The reaction components are converted in mechanochemical reactor 19 at temperatures ranging from 20 to 60° C., with the duty of water curve ranging from 0.9 to 1.2 in OPTIMIZED MECHANOCHEMICAL ACTIVATION MODE INCLUDING:

The automatic regulation of the restriction of the reaction composition by maximum allowable temperature using the opportunity to decrease the speeds of main motion drives 16, 17 of reactor 19 (the physical effect of mechanical equivalent of heat). Control over the temperature of the composition being converted is carried out at its output from reactor 19 by means of thermal sensor 32, and the speeds of drives 16 and 17 are decreased based on the results of this control by means of drive controllers 33. In this case, the speeds of raw material feeding drive 18 and meter 14 are also decreased, while also decreasing the feed of hydrogen peroxide solution into reactor 19 by means of meter pump 21.

The automatic restriction of the shift of mechanochemical reactor 19 to cavitation mode using the opportunity to decrease the speeds of drives 16 and 17 of the main motion of reactor 19 if cavitation noises appear within the volume of the reaction area of the reactor. The control of cavitation noises is carried out by means of acoustic sensor 34, and once they appear, the speeds of drives 16 and 17 are decreased smoothly using drive controllers 33 until cavitation noises disappear. The noise signals from the reaction areas of mechanochemical reactors 19 and 35 obtained by means of acoustic sensors 34 and 71 are communicated to controllers 33 via lines 72 and 73.

The change of the dynamic hydraulic impulse effect on the reaction composition with varying frequencies throughout the range, from 3200 to 16 Hz, for the time of 4 to 6 seconds, the time of the passage of the reaction composition REACTOR DOSE through the reactor. REACTOR DOSE SHALL MEAN THE VOLUME OF THE REACTION AREA of a mechanochemical reactor. In this case, shift speeds are changed from 100 to 0.5 meters per second. Thus, while the reaction composition is converted, each macromolecular cluster of the raw material component is sure to be subjected to mechanical exposure to the shift (with the application of friction forces at a certain "path length" to the elementary and hypothetical layers of the reaction composition), which is actually the introduction of mechanical energy into this reaction composition. The mechanical activation energy of the reaction composition at such reaction composition parameters amounts to approximately 20 MJ/m3.

A more complete representation of the operation of mechanochemical reactors 19 and 35 may be understandable due to its description as a component of the group of the presented inventions.

While the composition of leonardite with hydrogen peroxide solution is converted in mechanochemical reactor 19, the feed of the solution through the metering pump is controlled using flow meter 36. Converted composition 37 enters knockout drum 38, using which volatile substances—gases 39 forming as a result of chemical reactions and evolving from leonardite as a result of its mechanodestruction—are withdrawn from this composition. These volatile substances 39 are collected, condensed and stored in a special gas subsystem (not shown), and then these gases 39 are burnt in boiler 4 with process heat recovered. Converted composition 40 cleaned from gases 39 enters buffer circulation tank 41, from which this composition is sent through valve 42, via line 43 and using feed pump 44 FOR CONVERSION BY LEACHING to mechanochemical reactor 35 while controlling the conversion feed of the composition using flow meter 45 and flow indicator 46.

During the leaching process, the duty of water curve is increased to values ranging from 1.5 to 2.5 by adding an alkali water solution or pH-corrected water to the composition being converted. The liquid component being added is sent to mechanochemical reactor 35 via lines 47 and 164 using metering pump 48, through valves 49 and 165, from mixer 50, while controlling the feed of this component by means of flow meter 51. In this case, as it has been specified above, pH-corrected water rather than that containing chemical additives is fed using pump 52 from water treatment and water desalination system 1 via line 53 through valve 54, check valve 55 and through valve 56 into mixer 50. In this case, pH-corrected water "transits" alkali mixer 50.

Depending on the commercial requirements to the product, in this case, the BALLAST ORGANIC FERTILIZER in the form of suspended gel, leaching can be optionally carried out using sodium or potassium hydroxides. In this version, alkali 59 metered on weighing unit 58 is loaded from warehouse bunker 57 to mixer 50, and treated (and softened if necessary) water is also metered into it via line 53. Then, mixer agitator 50 is started for 1 to 2 minutes, and the process alkaline solution is thus prepared. The amount of the water used in the process is calculated in advance based on the fact that the composition fed to mechanochemical reactor 35 for conversion already contains water and that the duty of water curve of its conversion in reactor 35 must range from 1.5 to 2.5.

During the conversion of the reaction composition, mineral fertilizers and/or micronutrients 60 are introduced into mechanochemical reactor 35 if necessary.

The operation of mechanochemical reactor 35 is similar to that of reactor 19, as it is described above. Temperature control in reactor 35 is carried out using thermal sensor 61.

Using switch 62, finished products 63—BALLAST ORGANIC OR ORGANOMINERAL FERTILIZERS in the form of suspended gels—are taken out of the process for packaging and warehousing (not shown).

Switch 62 can also be used during start-up and commissioning to collect samples 64 during the experimental works to select the modes of raw material composition conversion. Mechanochemical reactor 19 for the collection of samples 66 is also equipped with a similar switch, 65.

Valves 67 to 69 installed on the outlet nozzles of mixers 10, 50 and 70 are designed for the preventive flushing of these mixers in the time between the experimental selections of reaction components and equipment operation modes to preclude the potential undesirable mutual influence of some chemical substances or other on each other.

During the recovery of some product or other from the supposed product range according to the presented invention, circulation cycles may be used in mechanochemical reactors 19 and 35, when the composition being converted is sent from reactor 19 to its inlet for repeated conversion. The number of such cycles can range from two to six.

During this cyclic conversion of raw material compositions, the time of change in the frequencies of hydraulic impulse effect on these compositions being converted within the above frequency range is increased in accordance with the number of cycles. To complete the conversion of the raw material components using circulation cycles, suitable pipelines and valves (not shown in FIG. 1) are used. Furthermore, if a large-tonnage process unit is created on the basis of the presented invention, then cyclic circulation conversion (if necessary under the process operating procedure of the manufacturing of any product) is substituted with conversion in multiple mechanochemical reactors, when the composition being converted is consecutively transferred from one reactor to another. Such version of the process regarding reactors 19 and 35 is not shown in FIG. 1 due to its simplicity.

According to the presented method, THE PROCESS OF PRODUCTION OF HUMIC BIOLOGICALLY ACTIVE PREPARATIONS—BALLASTLESS SOLUTIONS OF HUMIC ACID COMPOSITIONS OF VARIOUS CONCENTRATIONS AND WITH VARIOUS MINIMUM RESIDUAL COMPOSITIONS OF SOLID FRACTIONS BY SIZE—is carried out in TWO versions. The first version is as follows.

In the first stage, ballast humates in the form of suspended gels are prepared as described above. In this case, suspension 130 obtained is sent using switch 62 to knockout drum 74 by means of which volatile substances are withdrawn from this composition suspension—gases 75 forming as a result of chemical reactions and evolving from leonardite as a result of its mechanodestruction. These volatile substances 75 are collected, condensed and stored in the special gas subsystem mentioned above, and then these gases 75 are burnt in boiler 4, yielding process heat.

Converted suspension composition 76 cleaned from gases 75 and composed of HA water and alkaline solution and a solid fraction is sent to a special unit—DISSOLVER-DESTABILIZER 77. While this unit is filled with suspension composition 76 and until it is removed from this unit, the operating mode of the mixer and high-speed mill of unit 77 is maintained, which continues the completion of the HA leaching process.

The time of containment of the suspension composition in unit 77 in turbid condition is 1 to 5 minutes, after which this composition is subjected to mechanical division into solid and liquid phases on a high-speed centrifuge-decanter 78. For this, the suspension composition is sent to decanter 78 via line 79 using pump 80 and through valve 81.

During this, decanter 78 is started, and the completeness of the composition's division into phases is controlled using flow meter 82 and the level meter embedded in unit 77. Separated solid phase 83 is sent from decanter 78 to dryer 2 of the fuel briquette preparation and process heat generation system, and liquid phase 84, which is an HA water and alkaline solution, is sent from decanter 78 to buffer reservoir 87. Then, this HA water and alkaline solution is sent from buffer reservoir 87 to dissolver-destabilizer 77 using pump 88, via lines 89 to 91, through valve 92, check valve 93, valve 94, and through valve 95. The completeness of the transfer of the HA water and alkaline solution from buffer reservoir 87 to dissolver-destabilizer 77 is controlled using the level meter embedded in reservoir 87 and using flow meter 96.

Before the end of the process of transferring the water and alkaline solution to dissolver-destabilizer 77, a 10 to 20% process solution of an acid, e.g. hydrochloric acid, whose concentrate is stored in warehouse acid reservoir 97, is prepared. To this end, acid mixer 70 is first filled with a dose of water via lines 53 and 98, through check valve 99, through valves 54 and 100. Then the agitator of acid mixer 70 is switched on, and then, valves 101 and 102 are opened, and the acid is dosed (by gravity) via line 103 to mixer 70. The acid dose in this case is controlled by means of embedded level meters in warehouse acid reservoir 97 and in acid mixer 70. In 5 to 10 seconds, once the metering ends, the agitator of acid mixer 70 is stopped.

Further on, while the agitator and high-speed mill of dissolver-destabilizer 77 work, the acid dose is transferred from mixer 70 to dissolver-destabilizer 77 by gravity via line 104, through valves 105 and 106, thus carrying out the process of acidification of the medium being converted with pH being decreased to 1.5 to 3, while the HAs withdraw from the solution to the heavy phase in the form of coagulated pulp. The dose of the acid solution introduced into dissolver-destabilizer 77 is controlled using flow meter 155. Flocculant 107 is added within 2 to 4 minutes after the introduction of the acid into dissolver-destabilizer 77 is completed if necessary, and its agitator and high-speed mill are stopped after 2 to 4 more minutes.

For the next 5 to 20 minutes (depending on the use of the flocculant), the HA is sedimented in the form of a gel or large flocks. A part of the liquid phase, the mother solution, which is the solution of the products of alkali and acid neutralization, is withdrawn from a certain level of dissolver-destabilizer 77 by means of pump 108 via lines 109 and 110, through valve 111, to water treatment and water desalination system 1, where this solution is desalinated, and commercial-condition salts are produced, whereas the pure water is returned to the main technological processes.

Then, the agitator and high-speed mill of dissolver-destabilizer 77 is started, and dry alkali 112 is introduced into it, raising pH to 8.5 to 10. Thus, the HAs are transferred from the heavy phase (within 1 to 2 minutes of the operation of the agitator and high-speed mill of dissolver-destabilizer 77) to a new secondary solution—a product which is now obtained with the HA concentration increased to 10 to 15%. In this case, the concentration of the HA solution obtained is determined not only by the HA content in the primary alkaline solution, but also by the amount of the mother solution collected from dissolver-destabilizer 77.

The product thus obtained—A BIOLOGICALLY ACTIVE PREPARATION, BALLASTLESS HUMIC ACID COMPOSITION SOLUTION—is transferred to warehouse commercial reservoir 113 by means of pump 88, via lines 109, 114, 89, 90 and 115, through valves 111 and 116. In this case, the completeness of the transfer of the product to warehouse commercial reservoir 113 is controlled using flow meter 117 and the level meter embedded in dissolver-destabilizer 77. The product is taken from warehouse reservoir 113 for sale via line 118, through valve 119.

The water solution of this product can be used for effective plant cultivation. In this case, to use the solution obtained in hydroponics processes, it is additionally purified at filter 120 and sent to warehouse commercial reservoir 121. In this case, the HA solution obtained and that in dissolver-destabilizer 77 is called a semi-product and sent to filter 120, also with pump 88, via lines 109, 114, 89 to 91 and 121, through valve 111, 94 and 122.

The filtered solution is a product containing 0.5% of solid phase particles or less with sizes below 40 μm and can be used in plant cultivation using hydroponics processes. This product is sent from filter 120 via lines 123 and 160, through valve 124, to warehouse reservoir 121. The product is sent for sale from warehouse reservoir 121 via line 125 and through valve 126.

Residual solid phase 127 is sent from filter 120 using process transport 128 to the fuel briquette preparation system, where this solid phase 129 is loaded into dryer 2.

In the second version according to the presented method, THE PROCESS OF PRODUCTION OF HUMIC BIOLOGICALLY ACTIVE PREPARATIONS—BALLAST- LESS SOLUTIONS OF HUMIC ACID COMPOSITIONS OF VARIOUS CONCENTRATIONS AND WITH VARIOUS MINIMUM RESIDUAL COMPOSITION OF FRACTIONS BY SIZE, is carried out as follows.

At the first stage, a low concentration "product" is prepared, namely HA water and alkaline solution 84, which is taken from decanter 78 (liquid phase) as described above to buffer reservoir 87.

Then, at the second stage of the process, this HA water and alkaline solution is sent from buffer reservoir 87 to vacuum evaporating apparatus 131 with a view to increasing its concentration. It is sent by means of pump 88, which performs the role of a charging pump for high-pressure pump 132 in this "process version", via lines 89, 90, 133 and 134 through valves 92 and 135 and check valve 93. In this case, before sending the HA water and alkaline solution to vacuum evaporating apparatus 131, this solution is subjected to activation in ejector emulsifier 136 in hydrodynamic pre-cavitation mode. The operation of ejector emulsifier 136 in such mode is ensured by means of high-pressure pump 132, regulated throttle 137, with which the necessary back pressure is ensured, and a buffer reservoir (not shown). The completeness of the use of the HA water and alkaline solution taken from buffer reservoir 87 is controlled using flow meter 117.

To prevent the thermal destruction of the HAs, the operation of evaporating apparatus 131 is maintained in water boiling mode on the level of 60° C. using vacuum pump 138 creating a pressure of 19.87 kPa in condenser 139 and—via vacuum line 140 respectively—in evaporating apparatus 131.

Pure water is pumped from condensate trap 141 with condensate pump 142 to buffer reservoir 143 for condensate via line 144, through valve 145. This pure condensate water is used further on if and when necessary by "returning" it to water treatment system 1 with a view to replenishing the process water consumption or preparing the hydrogen peroxide solution or while preparing fulvic preparations as will be described below. To this end, the water is sent from buffer reservoir 143 using pump 146, via lines 147 and 12 to water treatment system 1, through valves 148 and 11, check valve 149 and through valve 23. In another case mentioned above, the water from buffer reservoir 143 is sent using pump 146, via lines 147, 12 and 150 to mixer 10, through valves 148 and 13, check valve 149 and through valve 23. In yet another case mentioned above, the pure water from buffer reservoir 143 is sent using pump 146 and metering pump 21, via line 147, through a buffer reservoir (not shown) to mechanochemical reactor 19, through valves 148 and 24, as well as through check valve 149.

The operation mode of evaporating vacuum apparatus 131 is also ensured by feeding warming vapor 151 into it from boiler 4. To regulate the feed of the warming vapor and stabilize the water boiling temperature on the level of 60° C. in this apparatus 131, thermal sensor 152 and adjustable valve 153 are used. In FIG. 1, the waste steam returned for heating from apparatus 131 to boiler 4 is shown as number 154.

Thus, some of the water is removed from the HA solution using evaporating vacuum apparatus 131, which increases the HA content in the solution to the commercial condition required. The finished product—the HA solution from apparatus 131—is taken to warehouse reservoir 113 or to warehouse reservoir 121 depending on the minimum allowable content of residual solid particles in the product.

The finished HA solution is taken from apparatus 131 using a product pump and a buffer reservoir (not shown), via lines 156, 157, or via lines 156, 158 to 160 and using logistic valves 161 to 163.

According to the presented method, THE PROCESS OF PRODUCTION OF HIGHLY BIOLOGICALLY ACTIVE PREPARATIONS—BALLASTLESS SOLUTIONS OF FULVIC ACID COMPOSITIONS OF VARIOUS CONCENTRATIONS WITH THE MINIMUM RESIDUAL COMPOSITION OF SOLID FRACTIONS BY SIZE—is carried out in two versions. Such raw material as leonardite is used due to the fact that leonardite is the richest raw material for humic preparation production, as its humic (protohumic) substance content reaches 90% [14, 32].

According to the first version as the easiest one, FAs are extracted from leonardite using pure water and adaptively optimized mechanoactivation. The relative simplicity of the technological process consists in the fact that no chemical substances are used in this version.

However, in this case, the HAs contained in the solid phase escaping the process are lost. At the same time, organic carbon is transferred to fuel briquettes, which results in the losses mentioned being replenished in terms of energy.

The technological process is carried out as follows:

Mechanochemical reactor 19 is started, and ground leonardite 20 prepared as described above is fed into it. At the same time, pure water is fed into reactor 19 via line 25 using metering pump 21, via valve 24.

In this case, the flows of leonardite 20 and pure water are regulated based on the prescribed duty of water curve of 2 to 3, depending on the characteristics of raw material leonardite 27 and in view of its water content that is controlled using sensor 26. Leonardite is converted in adaptively optimized mechanoactivation modes and in mechanochemical reactor 35 as well. The volatile substances formed—gases 39 and 75 which, as has been specified above, are used to generate process heat—are removed.

The process dose of reaction composition 76 is collected in dissolver-destabilizer 77, from where it is sent for mechanical phase division in decanter 78, via line 79, using pump 80, through valve 81. Solid phase 83 is sent from decanter 78 to dryer 2 of the fuel briquette preparation system, whereas liquid phase 84, which is a solution of FAs and a certain small part of water-soluble HAs, is collected in buffer reservoir 87. Then, the FA solution is subjected to filtration to make sure in contains solid particles with the maximum size of 40 μm, and the filtered solution is sent to warehouse reservoir 167 from filter 120 or from filter 120 through vacuum evaporating apparatus 131, a concentrated FA solution thus obtained. The FA solution is fed to filter 120 from buffer reservoir 87 using pump 88, via lines 89, 91 and 121, through valves 92, 94 and 122 and through check valve 93. The completeness of the withdrawal of the FA solution for filtration is controlled using the level meter embedded in buffer reservoir 87 and according to the indications of flow meter 96.

The filtered low-concentration FA solution is sent from filter 120 to warehouse reservoir 167 using the residual pressure after filter 120, via lines 123, 159 and 168, through logistic valves 124 and 163.

In the other case, the filtered low-concentration FA solution is sent from filter 120 to vacuum evaporating apparatus 131 via lines 123, 133 and 134, through valve 169, using high-pressure pump 132 and through ejector emulsifier 136 and adjustable throttle 137, whose intended use and operation are described above. As a result of the operation of vacuum evaporating apparatus 131, the concentrated FA solution, a commercial product, is obtained. This product also contains a small amount of low-molecular, active, water-soluble HAs. The properties of this product in application are somewhat improved owing to the HAs. The finished product is sent to warehouse reservoir 167 via lines 156, 158 and 168, through logistic valves 161 and 162.

According to the second version of the preparation of the FA solution, extraction is carried out by means of sodium or potassium hydroxide while also using adaptively optimized mechanoactivation. Hydrochloric or orthophosphoric acid is used in the technological process. The technological process according to this version ensures the production of not only the FA product solution, but also the HA solution which is also a commercial product.

The technological process is carried out as follows:

At the first stage of the technological process, a reaction composition is prepared from leonardite using leaching based on sodium or potassium hydroxide (otherwise, their pyrophosphates are used) or using no chemical substances and using the physical process of pH correction instead as it has been described above, and the reaction composition is concentrated in dissolver-destabilizer 77. In this case, the process of the liquid-phase oxidation of leonardite can be carried out in advance depending on its initial characteristics. The process of liquid-phase oxidation according to the presented invention is also described above. Then, the reaction composition is sent from dissolver-destabilizer 77 for phase division to decanter 78 as it has also been described above. Solid phase 83 is sent from decanter 78 to dryer 2 of the fuel briquette preparation system, whereas the liquid phase, which is a composition solution of HAs and FAs, is sent to buffer reservoir 87 via line 84. Then, this composition solution is transferred using pump 88 to dissolver-destabilizer 77 via lines 89 to 91, through check valve 93 and through valves 92, 94 and 95. The completeness of the transfer of the composition solution from buffer reservoir 87 to dissolver-destabilizer 77 is controlled using the level meter embedded in reservoir 87 and using flow meter 96.

Further on, during the operation of the agitator and high-speed mill of dissolver-destabilizer 77, an acid solution is introduced into it, pH decreasing to 1.5 to 2.5, and the process of withdrawing the HAs from the liquid phase to the heavy phase in the form of coagulated pulp is carried out within 5 to 15 minutes. Hydrochloric acid or orthophosphoric acid is introduced into dissolver-destabilizer 77 from acid mixer 70 via line 104, through valves 105 and 106. In this case, the metering of the acid solution is controlled using the level meter embedded in acid mixer 70 and using flow meter 155. To accelerate the process of withdrawing the HAs from the liquid phase, flocculant 107 can be introduced into dissolver-destabilizer 77. As a result of the completion of the process of the transfer of the HAs to the heavy phase, the FAs remain dissolved in the liquid phase. The agitator and high-speed mill of dissolver-destabilizer 77 are stopped, and HAs in the form of gel-like flocks are sedimented at the bottom of dissolver-destabilizer 77 for 10 to 20 minutes.

Then, using the technical capabilities of dissolver-destabilizer 77 (to be shown in detail below), the liquid phase from dissolver-destabilizer 77, which is an FA solution, is transferred to buffer reservoir 166 using pump 88, via lines 109, 114, 89 to 91 and 85, through valves 111, 94 and 86. The FA solution is sent from buffer reservoir 166 using pump 88 to filter 120, where solid particles 127 with sizes over 40 μm are separated and sent to carrier 128 to be disposed of into the fuel briquette preparation system. The FA solution is fed to filter 120 via lines 170, 89 to 91 and 121, through valves 171, 94 and 122 and through check valve 172. The completeness of the withdrawal of the FA solution from buffer reservoir 166 for filtration and then for concentration is controlled using the level meter embedded in reservoir 166 and according to the data of flow meter 96.

Then, the filtered FA solution is sent from filter 120 to vacuum evaporating apparatus 131, and the concentration of the product is increased as it has already been described above. The finished product (concentrated FA solution) is sent to warehouse reservoir 167.

A water and alkaline solution which is metered from alkali mixer 50 by means of metering pump 48 is poured to the sedimented HAs in dissolver-destabilizer 77. This solution is sent via lines 47 and 173, through valves 49, 165 and 174. Metering is controlled using the level meter embedded in alkali mixer 50 and according to the data of flow meter 51. At the same time, the agitator and high-speed mill of dissolver-destabilizer 77 are switched on, and the HAs are dissolved in it within 1 to 2 minutes after the end of the introduction of the alkaline solution. Then the HA solution, as it has been described above, is sent to warehouse reservoir 113 or, using filtration, to warehouse reservoir 121.

The FA solution obtained possesses extremely high biological activity and is of high commercial value. FAs have relatively small molecular weights and, consequently, they penetrate the roots, stalks and leaves of plants well. While penetrating, FAs bring micronutrients from the surfaces of plants to their tissues. When applied on the foliage, an FA transports micronutrients right into the metabolic centers of plant cells [31, 37].

If potassium hydroxide and orthophosphoric acid have been used in the process of obtaining this product (as specified above), such product can be used in animal husbandry, poultry farming and fish farming.

Humic biologically active preparations—ballastless "dry" HA salts and highly biologically active ballastless preparations—"dry" fulvic acid salts, fulvates, are prepared according to the processes described above, the only difference being that products are dried in vacuum evaporating apparatus 131 to the water content corresponding to their commercial conditions. The withdrawal of finished products in FIG. 1 is marked with number 175.

THE PREPARATION OF FUEL BRIQUETTES in accordance with the presented invention is carried out as follows:

Residual (after the processes of preparation of humic and fulvic preparations) solid fractions 83 and 129, which consist mainly of organic carbon and 10 to 25% of mineral components, are sent to dryer 2 of the fuel briquette preparation system, where a part of moisture is removed from this material, its content being reduced from 40 to 60% to 15 to 20%. During the drying of this material, this dried material 176 is metered into extruder 3 in a continuous flow by means of turning and "blowing" with hot gases, for instance, like a fluidized bed. Extruder 3 is heated with hot flue gases 177 coming from boiler 4 when a part of fuel briquettes 178 being produced is burnt in it and the combustible part of volatile substances 179 (the total of volatile substances 39 and 75 withdrawn from the coal raw material while it is converted into humic fertilizers and humic and fulvic acid preparations) is burnt.

The temperature of the flue gases heating the thermal contacting parts of extruder 3 with material 176 is regulated within the range of 600 to 650° C. according to the indications of a pyrometer (not shown) and by means of regulating valves 180 and 181.

Other "channels" for the regulation of the temperature of gases 177 warming extruder 3 include the machines for fuel transfer (not shown) of briquettes 178 and volatile substances 179 to boiler 4. The potential excess heat of flue gases 182, of boiler 4 is vented to the atmosphere by means of regulating valve 181. Warming flue gases 177, while passing extruder 3, give up a part of their heat in it. And then, these gases 182, their temperature ranging from 400 to 450° C., are sent to dryer 2, where these gases give up the other part of their heat for the removal of moisture from the solid fractions of materials 83 and 129 and for their heating. Then, these flue gases 183, cooled to a temperature of 110 to 115° C., are removed from dryer 2 into the atmosphere.

During the semi-coking of material 176 in extruder 3, a steam-and-gas composition [27, p. 197] whose gases partially consist of combustible substances, which results in off-gases 184 being sent from extruder 3 to boiler 4 for their combustible part to be burnt, is withdrawn from this material.

After fuel briquettes 185 leave extruder 3, they are cooled and stockpiled 186, as well as packaged into commercial packaging.

Figure 2:
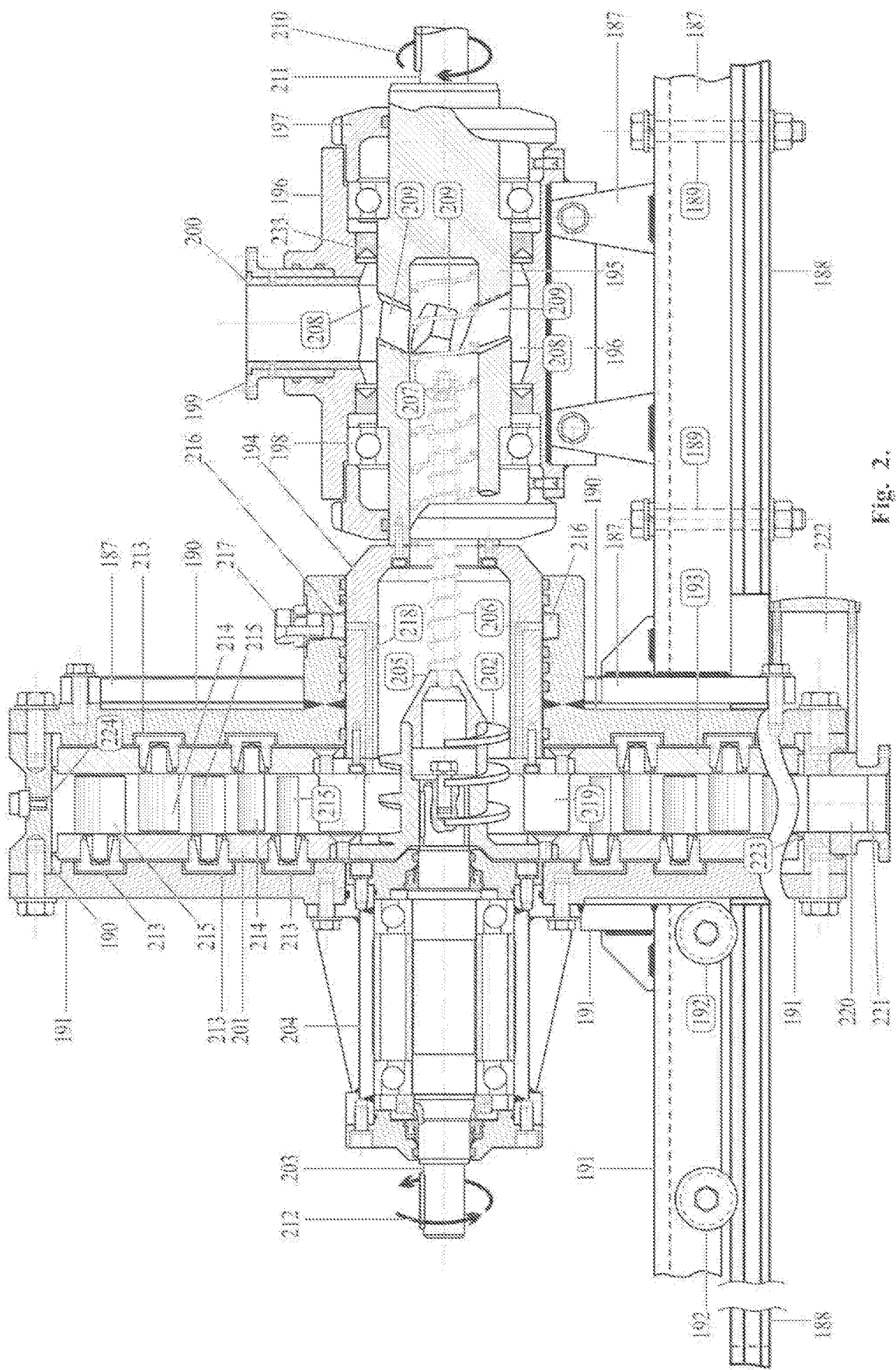
FIG. 2. The design arrangement of the mechanochemical reactor for the conversion of high viscosity media with mechanoactivation energy regulation.

THE EMBODIMENT OF THE INVENTION REGARDING THE MECHANOCHEMICAL REACTOR for the conversion of high viscosity media including suspensions and pulps is illustrated with as-built drawings FIGS. 2 to 5. The design arrangement of the reactor is represented in FIG. 2. Here, the body of the reactor, which is mounted on fixed guides 188 using thread joints 189, is marked with number 187. In this case, reactor case 190, 191 is made split, consisting of the stationary part (case 190) and the movable part (case 191), which can be moved using wheels 192 on guides 188 to the preventive maintenance and repair position.

An electric motor (not shown) driving rotor disk 193 fixed on supporting sleeve 194, which, in its turn, is rigidly connected with the hollow drive shaft 195 of the hydraulic puller, which is shown through case 196, shields 197, bearings 198 and load port 199, is placed on body 187. In this case, an autonomous screw adjustable drive (not shown) is installed on load port 199 from the top, and the internal surface of port 199 is equipped with insert 200 made of an anti-adhesion material.

An electric motor (not shown) driving rotor disk 201 fixed on supporting screw sleeve 202, which, in its turn, is rigidly fixed on drive shaft 203 of supporting bearing assembly 204, is placed on movable case 191.

Small console screw 206, which is axially inserted into hollow drive shaft 195 of the hydraulic remover, on whose internal surface "radially embracing" screw 207 is rigidly fixed, is fixed on supporting screw sleeve 202 using adapter sleeve 205.

The distribution manifold ring of the hydraulic puller connected with load port 199 on the one side and connected to hydraulic valve gaps 209 made in the hollow drive shaft 195 of the hydraulic puller is shown as number 208. Here, the direction of the operating rotation of driving shaft 211, hollow drive shaft 195 of the hydraulic puller is shown as number 210. The operating direction of the rotation of driving shaft 203 is shown as number 212.

Circular rows of bearing rods 214 and 215 respectively are fixed on rotor disks 193 and 201 using detachable fixings 213, e.g. collet closers.

The distribution manifold ring of stationary case 190 connected to sleeve fitting 217 for introducing liquid components into the reactor on the one side and connected to valve ports 218 made in supporting sleeve 194 on the other side is shown as number 216. Pump-and-screw blades 219 ensuring the reliability of the casting of the flow of the medium being converted to the area of the activation interaction of rods 214 and 215 are fixed on this supporting sleeve 194.

Fixed reflecting and directing blades 220 are placed in off-loading gap 221 of the reactor, and to ensure the reliability of the removal of the high viscosity media being converted from the reactor, these blades, as well as off-loading gap 221 itself, are connected with vibration impact electromagnetic device 222.

Mini-screw, single-turn threads made on the cylindrical surfaces of the rotor disks, which actively reflect the materials being converted from the gaps between the rotor disks and the internal "cylindrical" surface of case 190 of the reactor when the rotors rotate, are shown as number 223.

Acoustic signals, including cavitation-type noises, are picked up from the reaction area using acoustic sensor 224 embedded in case 190.

Figure 3:
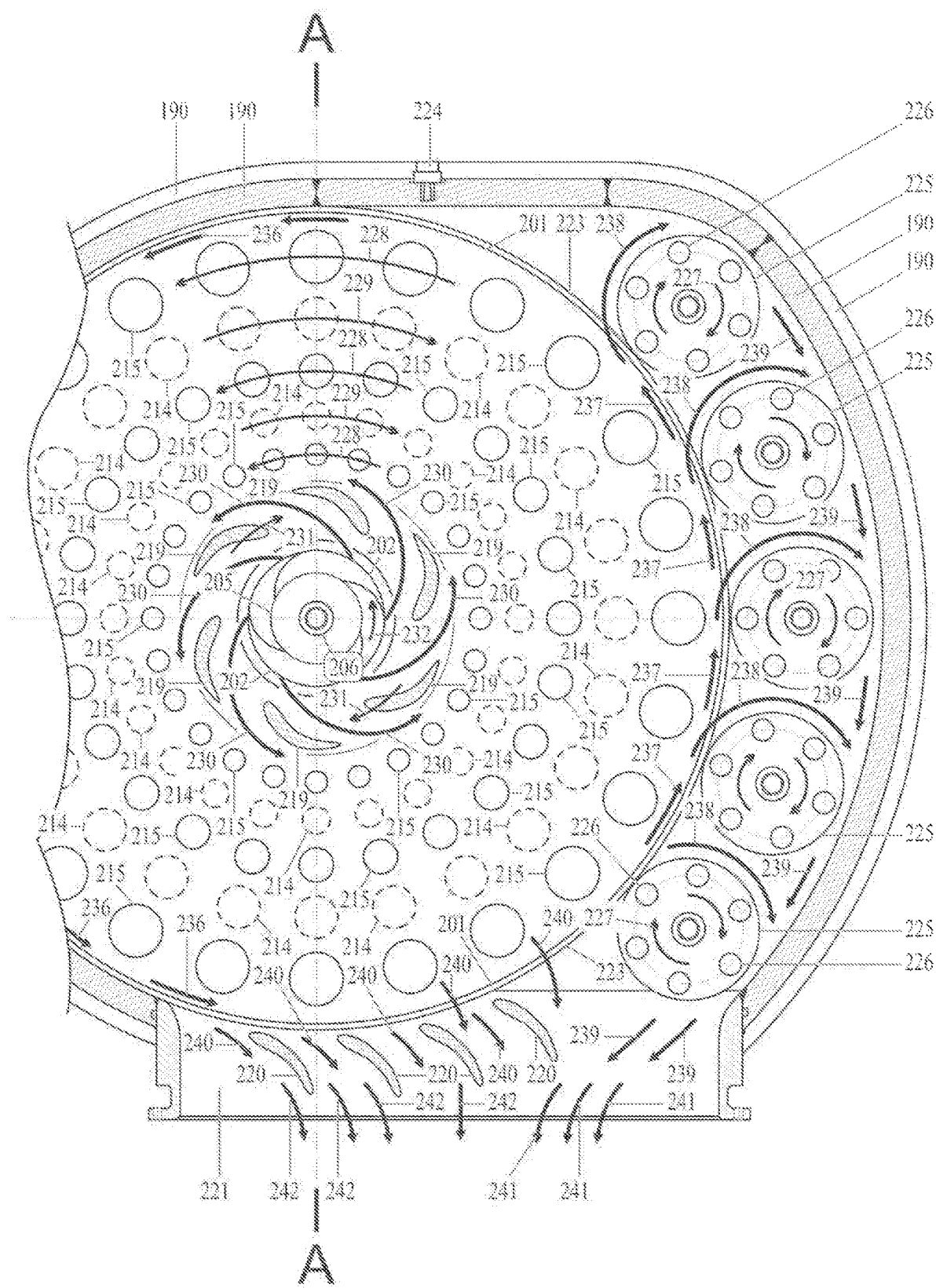
FIG. 3. The design and arrangement flow diagram of the moving elements and movement of the mechanochemical reactor high viscosity media being converted.

The placement of cleaning mini-rotors 225 in case 190 of the mechanochemical reactor with cleaning rods 226 installed on them is shown in detail in FIG. 3. Here, the rotation direction of mini-rotors 225 is shown as number 227, and the rotation direction of rotor disk 201 with rods 215, whose peripheral row is the closest to cleaning mini-rotors 225, is marked with number 228. The rotation direction of rotor disk 193 (not shown) with rods 214 is shown in the same FIG. 3 as number 229.

Directions 230 of the movement of the medium being converted under the influence of pump-and-screw blades 219 ensuring the reliability of the casting of the flow of this medium to the area of the activation interaction of rods 214 and 215 are marked. In this case, direction 231 of the rotation of pump-and-screw blades 219 coincides with the rotation direction of rotor disk 193 (not shown in FIG. 3). The rotation direction of supporting screw sleeve 202, which helps feed the medium being converted to pump-and-screw blades 219, is shown as number 232.

Figure 4:
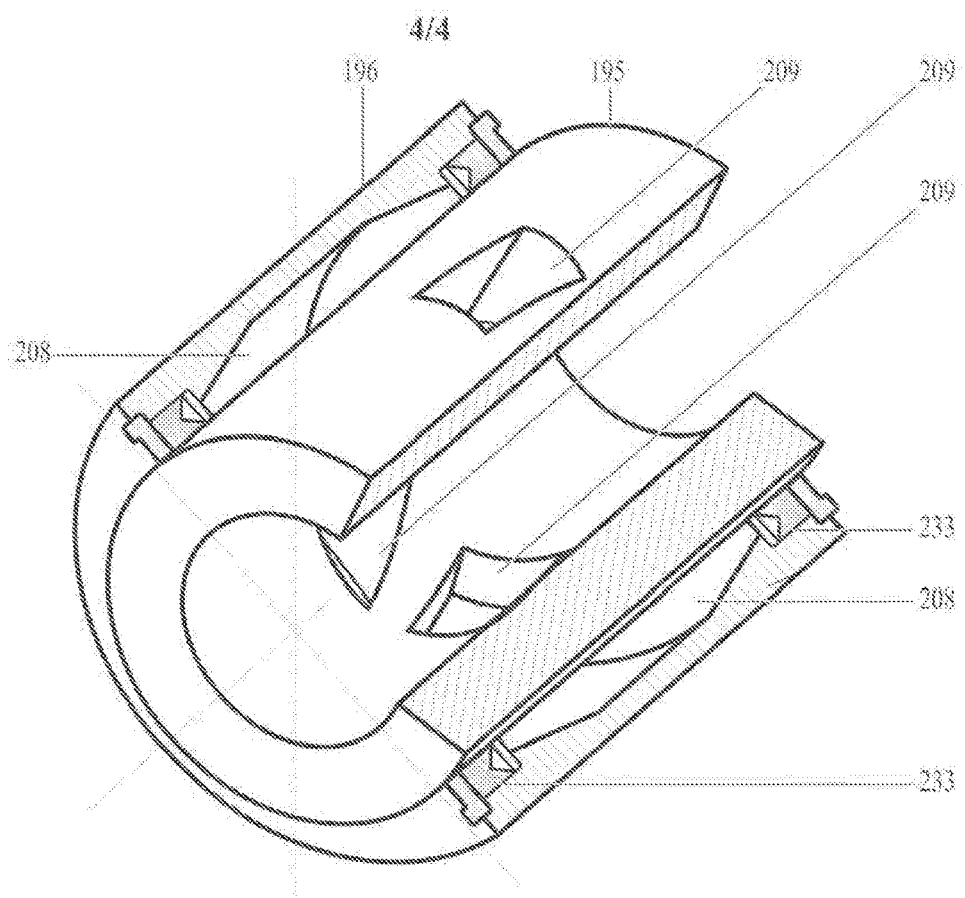
FIG. 4. The as-built drawing presenting the functional and design peculiarities of the hydraulic puller assembly ensuring the feed of high viscosity media into their conversion area in the mechanochemical reactor.

The orientation and placement of valve gaps 209 made in hollow drive shaft 195 of the hydraulic puller are shown in FIG. 4 in detail. It is here that the distribution manifold ring of the hydraulic puller connected to load port 199 (not shown in FIG. 4) is shown as number 208. The same distribution manifold ring 208 is connected to valve gaps 209 as well. The sealing elements ensuring the waterproofing of bearings 198 of the hydraulic puller assembly from the media being converted are shown as number 233.

Figure 5:
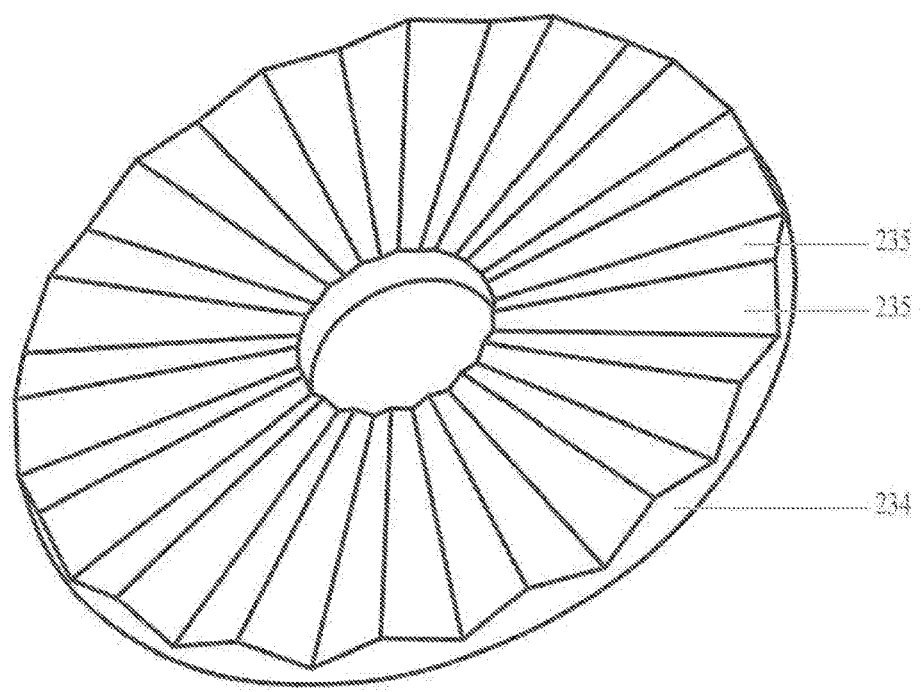
FIG. 5. The as-built drawing presenting the basis of the design of the mechanochemical reactor rotor disks for cases of processing of anomalously viscous, slow-flowing media.

The general layout of rodless rotor 234 with radial and wave surfaces 235 designed for the conversion of special anomalously viscous, slow-flowing media in the mechanochemical reactor is shown in FIG. 5.

THE OPERATION OF THE MECHANOCHEMICAL REACTOR (with the exception of the chemistry of the processes, which is described above in detail—from the perspective of mechanics) IS PERFORMED AS FOLLOWS.

First of all, the main motion drives of the reactors are started with the rotation of shafts 203 and 211 and the respective rotor disks 193 and 201. Then, the main (viscous or highly viscous) component being converted is fed into the reactor through load port 199, and after a short delay time (0.5 to 2.5 seconds), a liquid component flow is directed into the reactor via sleeve fitting 217. The metering of the flows of the components being converted into the reactor, the speeds of its main motion drives and the delay time are according to the process operating procedure corresponding to the chemistry of the conversion process. Vibration-impact electromagnetic device 222 is switched on then, after the delay time, as well.

The viscous or highly viscous component being converted is fed into distribution manifold ring 208 and through it, into hydraulic valve gaps 209 by means of screw drive 18. The surfaces of hydraulic valve gaps 209 are spatially oriented so that these surfaces form the pump reflecting forces affecting the flow of the component being converted (to the rotation axis of shaft 195 in the radial direction and to the area of the active interaction of rods 214 and 215 of the reactor in the axial direction of shaft 195) while hollow drive shaft 195 rotates. This ensures the advance of the medium being converted with the change in its direction and ensures the transfer of the flow of the component being converted from fixed load port 199 to the cavity of rotating drive shaft 195. Here, the viscous or highly viscous component being converted enters the field of the effect of the forces driving it "on all sides": from axial small console screw 206 and from "radially embracing" screw 207, which is made in left-handed thread turns. Thus, guaranteed injection of the viscous or highly viscous component being converted into internal cavity 194 of supporting sleeve 194 is carried out. As a result of such injection, the component being converted that is in the internal cavity of supporting sleeve 194 is exposed to a certain pressure of the hydraulic puller, which results in it being picked up freely by supporting screw sleeve 202 and directed towards pump- and screw blades 219, with which the flow of the composition being converted is cast into the activation interaction area of rods 214 and 215. Here, the medium being converted is already called a composition, as the flow of the medium "running" to pump-and-screw blades 219 (right here) is where the liquid component is injected using meter pumps 21 or 48 via valve ports 218, which are fed from distribution manifold ring 216 of stationary case 190, which is, in its turn, fed through sleeve fitting 217.

The mechanochemical conversion of the reaction components is carried out in the active interaction areas of the circular rows of rods 214 and 215 as described above owing to the static and dynamic adjustable parameters in accordance with the process operating procedure. During this conversion, the reaction components, affected by gravitational and centrifugal forces, advance over the reaction zone in radial directions relative to the rotation axes of rotor disks 193 and 201.

Upon reaching the periphery of the rotor disks, the composition being converted is forced to move along the internal cylindrical surface of case 190 of the reactor, exposed to drawing friction forces acting from the peripheral row of rods 215, as shown in FIG. 3 with number 236. In this case, the vertical components of this movement, the one left of axis A, are favorably directed towards the withdrawal of the reaction component from the reactor, i.e. towards off-load gap 221. The vertical components of "this" circular movement (marked with number 237) right of axis A are directed opposite to off-load gap 221 and are a potential reactor contamination factor.

Due to this fact, cleaning mini-rotors 225 with the following effect are applied and included in the design assembly in accordance with the inventive conception. In the areas of the "minimum contact" distances between rods 215 and cleaning rods 226, their speed vectors (tangential to the circles in which these rods move) coincide in their directions and are close in the angular directions 237 of the movement of the reaction composition. Due to this fact, a part of the moving (237) flow of the composition being converted is deflected next to each cleaning mini-rotor 225 (in directions 238) with no significant energy consumption and with no formation of pressure jumps localized there, owing to the drawing active friction forces of cleaning rods 226. And thus, the whole peripheral flow in direction 237 is re-formed to a new flow in direction 239, which in its turn, moves towards off-load gap 221, where it is withdrawn from the reactor in direction 241 under the effect of the gravitation force and "favorably meeting" the flow in direction 240. In this case, the flow in direction 240 mentioned is formed from the flow in direction 236 under the effect of centrifugal forces and the gravitation force.

The major part of the flow in direction 240, as shown in FIG. 3, diverges additionally owing to the response of fixed reflecting and directing blades 220 and withdrawn from the reactor by this diverged flow in directions 242.

INDUSTRIAL APPLICABILITY

The applied method of comprehensive conversion of coal series caustobioliths, mostly brown coals and leonardite, into products including humic organic and organomineral fertilizers and into humic and fulvic preparations with fuel briquettes being obtained can be applied for large-tonnage production of these products for commercial purposes in the field of agriculture for the production of environmentally friendly foodstuffs in animal husbandry, poultry farming and fish farming processes.

Furthermore, the products manufactured according to the presented method can be used as components of artificial soils and ameliorants, as is, for instance, shown in [88], jointly with zeolite materials, with serpentinite and with mineral fertilizers.

The majority of the equipment units associated with the processes of the preparation of the products obtained according to the presented invention in the industries of a number of countries has been tested and is in operation.

BIBLIOGRAPHIC DATA OF THE REFERENCES

1. I. V. Perminova, D. M. Zhilin. Humic substances within the context of green chemistry. In: GREEN CHEMISTRY IN RUSSIA, V. V. Lunin, P. Tundo, Y. S. Lokteva (Ed.), Moscow University Publ. House, pp. 146-162.
2. O. S. Bezuglova. FERTILIZERS AND GROWTH STIMULANTS. Rostov-on-Don: Feniks Publ. House, 2000; 2002. —320 pp.
3. I. V. Perminova. HUMIC SUBSTANCES: A CHALLENGE TO THE CHEMISTS OF THE 21ST CENTURY. Khimiya i Zhizn, 2008, #1.
4. Utilisation of Low Rank Coals David J Allardice and Brian C Young*Allardice Consulting 10 Arcady Grove, Vt., Vic 3133, Australia.
5. T. A. Kukharenko. ON THE MOLECULAR STRUCTURE OF HUMIC ACIDS. From the book of HUMIC SUBSTANCES IN THE BIOSPHERE compilation, ed. by D. S. Orlov. —Moscow, Nauka Publ. House, 1993. —237 pp.
6. V. A. Mikheyev, G. I. Petrova, M. D. Novopashin, M. I. Bychov. Certificate for Utility Model RU 13656 U1, May 10, 2000. A UNIT FOR OBTAINING HUMIC SUBSTANCES.
7. V. A. Mikheyev, G. I. Petrova, M. I. Bychov. THE TRANSFORMATION OF BROWN COALS INTO HUMIC SUBSTANCES UNDER THERMAL EXPOSURE. —Yakutsk: YF, SB RAS Publ. House, 2002.
8. THE PHYSICAL ENCYCLOPEDIC DICTIONARY. Editor-in-chief: A. M. Prokhorov, Moscow, Sovetskaya Entsyklopediya Publ. House, 1983, p. 100; p. 236, 237.

9. U.S. Pat. No. 7,896,944 B2. Mar. 1, 2011. METHOD FOR EXTRACTING FULVIC ACID MOLECULES.
10. U.S. Pat. No. 7,825,266 B1. Nov. 2, 2010. EXTRACTION OF FULVIC MINERALS FROM HUMIC SUBSTANCES.
11. U.S. Pat. No. 8,383,840 B1. Feb. 26, 2013. EXTRACTION OF FULVIC MINERALS, VITAMINS, AMINO ACIDS, ENZYMES, AND PHYTONUTRIENTS FROM HUMIC SUBSTANCES.
12. U.S. Pat. No. 7,875,096 B2. Jan. 25, 2011. FERTILIZER.
13. U.S. Pat. No. 5,004,831. Apr. 2, 1991. RECOVERY OF HUMIC ACIDS.
14. U.S. Pat. No. 6,204,396 B1. Mar. 20, 2001. METHOD FOR PRODUCING CALCIUM FULVATE FROM HUMUS MATERIAL.
15. A. D. Petrakov, S. M. Radchenko, O. P. Yakovlev, A. I. Galochkin, M. V. Yefanov, P. R. Shott, V. V. Vysotskaya. RF Patent, RU 2296731. Apr. 10, 2007. A METHOD OF OBTAINING ORGANOMINERAL FERTILIZERS AND A PROCESS LINE FOR ITS IMPLEMENTATION.
16. P. V. Tkachenko, B. I. Shpaner, A. I. Gluschenko. Inventor's certificate SU 937445. Jun. 23, 1982. A METHOD OF HUMIC ACID WITHDRAWAL.
17. N. M. Smolyaninova, S. I. Khoroshko, A. N. Moskalchuk. A PROCESS OF OBTAINING soluble humates from peat. Proceedings of S. M. Kirov Tomsk Polytechnic Institute. Volume 178, 1969. pp. 158-161.
18. V. M. Khaustov, V. N. Kulakov, V. V. Kulakov, A. P. Mescheryakov, M. T. Shokin, R. Y. Fridburg. Inventor's certificate SU 1404501. Jun. 23, 1988. A METHOD OF HUMIC ACID WITHDRAWAL FROM BROWN COAL.
19. A. I. Shulgin, O. V. Skvortsov, A. V. Kudin. Russian Patent RU 2042422. Aug. 27, 1995. A METHOD OF OBTAINING HUMIC ACIDS AND A DEVICE FOR IT.
20. V. I. Ens, S. V. Shatalov. Russian Patent RU 2350587. Mar. 27, 2009. A METHOD OF OBTAINING ORGANOMINERAL FERTILIZERS.
21. M. V. Yefanov, P. P. Chernenko, V. A. Novozhonov. Russian Patent RU 2384549. Mar. 20, 2010. A METHOD OF OBTAINING NITROGEN-CONTAINING HUMIC FERTILIZERS FROM PEAT.
22. V. M. Ferdman, I. M. Gabbasova, T. T. Garinov, I. O. Sagitov, A. A. Tomilova. Russian Patent RU 2463282. Oct. 10, 2012. A METHOD OF OBTAINING WATER-SOLUBLE HUMIC ACIDS.
23. N. V. Prosyolkov, V. E. Glukhovtsev, N. V. Kapkin, S. V. Chestyunin, A. N. Kalinin, O. A. Panov, V. A. Filippov, V. I. Filyanov, A. V. Novikov. Russian Patent RU 2473527. Jan. 27, 2013. A METHOD OF PRODUCTION OF HUMIC ACID CONCENTRATE FROM BROWN COAL AND A LINE FOR HUMIC ACID CONCENTRATE PRODUCTION. 24. S. G. Shvetsov. Russian Patent RU 2378235. Jan. 10, 2010. A METHOD OF OBTAINING A COMPREHENSIVE HUMIC FERTILIZER.
25. A. A. Batsuyev, B. V. Levinskiy, A. V. Fursov, L. N. Stroganova. Russian Patent RU 2036190. A METHOD OF OBTAINING ALKALINE METAL HUMATES. May 27, 1995.
26. Y. B. Bilibin, A. A. Gerasenkov, E. R. Antonov, A. I. Alpatov, N. K. Kiselyov. Russian Patent RU 2049084. Nov. 27, 1995. A METHOD OF OBTAINING GROWTH BIOSTIMULANT FROM SAPROPEL AND/OR PEAT.
27. COAL CHEMISTRY AND TECHNOLOGY. A. A. Agroskin. Moscow, Nedra Publ. House, 1969.
28. A. S. Zhilyakov, S. F. Zhilyakov. Russian Patent RU 2420500. Jun. 10, 2011. A METHOD OF OBTAINING ORGANOMINERAL FERTILIZERS AND A PROCESS LINE FOR ITS IMPLEMENTATION.
29. D. V. Dudkin, A. S. Tolstyak, G. F. Fakhretdinova. Russian Patent RU 2429214. Sep. 20, 2011. A METHOD OF OBTAINING HUMIC ACIDS AND HUMATES FROM PEAT.
30. THE NEW POLYTECHNIC DICTIONARY, ed. by A. Y. Ishlyunskiy, Moscow, Bolshaya Rossiyskaya Entsiklopediya Scientific Publishing House, 2000.
31. Application No.: AU 2009200226 A1. Jan. 21, 2009. IMPROVED FERTILIZER.
32. Ozdoba D. M., Blyth J. C., Engler R. F., Dinel H., Schnitzer M. LEONARDITE AND HUMIFIED ORGANIC MATTER. In Proc Humic Substances Seminar V, Boston. Mass., Mar. 21-23, 2001. P. 34.
33. V. A. Dementyev, O. I. Brazhko. Russian Patent RU 2472761. Jan. 20, 2013. A METHOD OF OBTAINING A BIOLOGICALLY ACTIVE HUMIC PRODUCT.
34. V. G. Makarenko. Russian Patent RU 2500465. Dec. 10, 2012. A DEVICE FOR THE THERMAL PROCESSING AND BOILING DOWN OF FLOWING PRODUCTS.
35. B. V. Levinskiy, S. M. Kurchenko. Russian Patent RU 2179163. Feb. 10, 2002. A METHOD AND DEVICE FOR CONCENTRATING HUMIC ACID SALT SOLUTIONS.
36. U.S. Pat. No. 4,788,360 Nov. 29, 1988. PROCESS FOR THE PRODUCTION OF REGEN-ERATED HUMIC ACIDS FROM COAL.
37. Patent Abridgment AU-B-28114/89. Acceptance No. 623364. AGRICULTURAL CHEMICAL FOR FOLIAR APPLICATION. 14 May 1992.
38. M. V. Yefanov, A. A. Latkin, P. P. Chernichenko, A. I. Galochkin, A. D. Petrakov. Russian Patent RU 2370478. A METHOD OF OBTAINING OXYHUMATES FROM PEAT. Oct. 20, 2009.
39. T. I. Burmistrova, L. N. Sysoyeva, N. M. Trunova, N. N. Tereschenko. Russian Patent RU 2216172. Nov. 20, 2003. A METHOD OF OBTAINING A MEANS FOR PROTECTING PLANTS FROM FUNGUS DISEASES.
40. M. V. Yefanov, A. A. Latkin, P. P. Chernichenko, A. I. Galochkin. Altai State University SEI of HPT, Barnaul, Russia. OBTAINING OXYHUMIC PREPARATIONS FROM PEAT USING THE CAVITATION METHOD. Modern High-End Technologies #2, 2008.
41. V. N. Bogoslovskiy. Russian Patent RU 2469995. Dec. 20, 2012. A METHOD OF HUMIC ACID WATER-SOLUBLE SALT PRODUCTION.
42. Y. P. Zaporozhets, Y. Y. Zaporozhets, G. N. Tlekhuray, A. M. Bogus, L. P. Kholpanov. RF Patent, RU 2104964. Feb. 20, 1998. A METHOD OF WATER PROCESSING.
43. G. K. Zibert, Y. P. Zaporozhets. FR Patent, RU 2240984. Nov. 27, 2004. A METHOD OF WATER AND WATER SOLUTION PROCESSING.
44. A. D. Petrakov, S. M. Radchenko, O. P. Yakovlev. RF Patent, RU 2380399. Jan. 27, 2010. A METHOD OF PREPARING CAVITATION WATER-AND-COAL FUEL AND A PROCESS LINE FOR ITS IMPLEMENTATION.
45. I. P. Gaydabura, A. I. Vaganov, Y. G. Todorev. CONTROL OF ENERGY TECHNOLOGY EDDY UNITS USING THEIR ACOUSTIC FIELD. Industrial Energy Engineering magazine, 1986, #7, Moscow, pp. 36-39.
46. I. N. Kirillov, V. V. Bulkin. Utility Model Patent RU 137977. Feb. 27, 2014. AN ACOUSTIC NOISE SIGNAL CONTROL DEVICE.

47. V. V. Yelfimov, P. V. Yelfimov, A. R. Avetisian, A. P. Didichenko, S. P. Popov, A. F. Arutyunian. Russian Application for Invention RU 2012135445. Feb. 20, 2014. A METHOD OF CONTROL OF THE PROCESS OF INCREASE IN CAVITATOR OPERATION STABILITY.
48. V. I. Fedorchenko, N. A. Goncharenko, V. O. Kozminykh. DETERMINING THE PROCESS PARAMETERS OF THE RECOVERY OF HUMIC COMPOUNDS FROM THE BROWN COALS OF TYULGAN DEPOSIT. Journal of Orenburg State University, #5/May 2006. Appendix, pp. 75 to 80.
49. M. P. Kulikova, L. L. Kuular. A STUDY OF THE CHEMICAL COMPOSITION OF PEAT. Chemical Sciences. Fundamental Studies, #4, 2013, pp. 90 to 94.
50. A. A. Ivanov, N. V. Yudina, A. A. Ilyina. THE ACID AND ION-EXCHANGE PROPERTIES OF THE HUMIC ACIDS OF MECHANOACTIVATED PEATS. Plant Raw Material Chemistry, 2010, #4, pp. 145-150.
51. A. A. Ivanov, N. V. Yudina, O. I. Lomovskiy. The influence of mechanochemical activation on the composition and properties of the humic acids of peats. Proceedings of Tomsk Polytechnic University. 2006. Vol. 309. #5, pp. 73-76.
52. M. V. Gostischeva, I. V. Fedko, Y. O. Pisnichenko. A COMPARATIVE ANALYSIS OF THE METHODS OF WITHDRAWAL OF HUMIC ACIDS FROM PEATS WITH A VIEW TO OBTAINING HUMIC PREPARATIONS. Proceedings of Tomsk State University of Control Systems and Radioelectronics. 2004. Automated information processing, control and design systems, pp. 66-69. UDC: 631.41:631.417.
53. A. I. Shulgin. RF Patent, RU RU 2175651. Nov. 10, 2001. A METHOD OF OBTAINING HUMIC-MINERAL CONCENTRATE AND A DEVICE FOR ITS IMPLEMENTATION.
54. A. S. Karmanchuk, K. M. Kulov, O. K. Ivanova, R. N. Nazyraliyeva. Provisional Patent of Kyrgyzstan, KG 0163. Apr. 1, 1997. A METHOD OF OBTAINING ORGANOMINERAL FERTILIZER.
55. D. V. Dudkin, D. A. Yevstratova. Russian Patent RU 2442763. Feb. 20, 2012. A METHOD OF PLANT RAW MATERIAL HUMIFICATION.
56. V. S. Anikin. Russian Patent RU 2491266. Aug. 27, 2013. A METHOD OF OBTAINING HUMIC PREPARATIONS AND ULTRAHUMATE, THE SUBSTANCE OBTAINED USING THIS METHOD.
57. I. I. Biryukov, Y. I. Zelepukin, N. I. Biryukova, S. Y. Zelepukin. Russian Patent RU 2435749. Dec. 10, 2011. A METHOD OF FERTILIZER MANUFACTURING.
58. K. Y. Kovalyov, V. V. Papayanaki. Russian Patent RU 2219147. Dec. 20, 2003. A METHOD OF COMPREHENSIVE ORGANOMINERAL FERTILIZER.
59. D. V. Dudkin, D. A. Yevstratova. Russian Patent RU 2442763. Feb. 20, 2012. A METHOD OF PLANT RAW MATERIAL HUMIFICATION.
60. Y. A. Novitskiy. Russian Patent RU 2246469. Feb. 20, 2005. A METHOD OF WITHDRAWAL OF HUMIC ACIDS FROM SAPROPEL.
61. I. A. Berdnikov, K. O. Serov. Russian Patent RU 2248339. Mar. 20, 2005. A METHOD OF OBTAINING HUMIC FERTILIZERS.
62. V. I. Butakov, Y. V. Butakov, Y. V. Makushev. Russian Patent RU 2275348. Apr. 27, 2006. A METHOD OF OBTAINING ALKALINE METAL HUMATES.
63. D. M. Mirzayanov, F. G. Gabdullina, A. M. Syrkin, A. S. Lyubin, L. V. Gnezdilova, A. V. Frolov. Russian Patent RU 2281930. Aug. 20, 2006. A METHOD OF OBTAINING HUMIC ACIDS AND THEIR SALTS.
64. A. V. Apkaneyev, V. V. Degtyaryov, A. N. Chumakov. Russian Patent RU 2286970. Nov. 10, 2006. A METHOD OF OBTAINING WATER-SOLUBLE HUMATE.
65. M. R. Predtechenskiy, M. V. Pukhvoy, Y. V. Gaysler. Russian Patent RU 2307817. Nov. 10, 2007. A METHOD OF OBTAINING HUMIC CONCENTRATE AND A DEVICE FOR ITS IMPLEMENTATION.
66. Y. A. Kalinnikov, I. Y. Vaschurina, T. A. Kirdey. Russian Patent RU 2310633. Nov. 20, 2007. A METHOD OF OBTAINING LIQUID PEAT HUMATES.
67. V. I. Lomovtsev. Russian Patent RU 2319683. Mar. 20, 2008. A METHOD OF OBTAINING HUMIC-MINERAL CONCENTRATE.
68. G. G. Yagafarova, L. R. Akchurina, Y. A. Fyodorova, A. K. Safarov, I. R. Yagafarov. Russian Patent RU 2471755. Jan. 10, 2013. A METHOD OF OBTAINING BIOLOGICALLY ACTIVE HUMIC SUBSTANCES.
69. Peter Kner, Bruce Stanley. Application for Invention RU 2012132296. Dec. 27, 2010. A METHOD AND DEVICE FOR DRYING PASTE-LIKE MATERIALS, IN PARTICULAR THE SILT DEPOSITS OF WASTE WATER TREATMENT PLANTS, WITH HEAT ENERGY GENERATION.
70. V. P. Voronin, E. P. Volkov, Y. I. Gavrilov, A. F. Gavrilov, A. I. Blokhin, A. M. Bychkov, G. P. Stelmakh, F. Y. Keneman. Russian Patent RU 2211927. Sep. 10, 2003. A METHOD OF BROWN COAL THERMAL CONVERSION WITH POWER GENERATION AND A UNIT FOR ITS IMPLEMENTATION.
71. V. M. Zaychenko, V. F. Kosov, Y. S. Kuzmina, A. V. Markov, A. V. Morozov. Russian Utility Model Patent RU 136801 U1. Jan. 20, 2014. AN ENERGY TECHNOLOGICAL COMPLEX WITH A BIOPELLET TORREFICATOR.
72. D. V. Yeryomin. Russian Utility Model Patent RU 137755 U1. Feb. 27, 2014. A SINGLE-SCREW MIXER PRESS FOR EXTRUSION WITH FUEL BRIQUETTE RECOVERY.
73. I. I. Prilepina, V. P. Khanin. Russian Patent RU 2499671. Nov. 27, 2013. A SCREW PRESS FOR WOOD WASTE BRIQUETTING.
74. A. N. Ostrikov, M. S. Napolskikh. Russian Patent RU 2501501. Dec. 20, 2013. TWO-SCREW EXTRUDER.
75. P. P. Guyumdzhian, I. A. Romenskaya, V. A. Podokhin, N. M. Ladayev. Russian Patent RU 2169617. Jun. 27, 2001. A DEVICE FOR MILLING.
76. THE NEW POLYTECHNIC DICTIONARY. Ed. by A. Y. Ishlinskiy. Moscow, Bolshaya Rossiyskaya Entsyklopedia Scientific Publishing House, 2000.
77. V. S. Bayev. Russian Patent RU 2185244. Jul. 20, 2002. A METHOD OF OBTAINING LIQUID COMPOSITION FUEL AND A DISINTEGRATOR AND A HYDRAULIC IMPACT EFFECT DEVICE FOR ITS IMPLEMENTATION.
78. G. M. Gorshkov, R. K. Shigabutdinov. Russian Patent RU 2082487. Jun. 27, 1997. DISPERSER.
79. B. A. Kesel, A. D. Fyodorov, I. F. Gimushin, G. A. Volkov, R. S. Gataullin, D. V. Voskoboynikov, D. A. Veselyev. Russian Patent RU 2166986. Mar. 20, 2001. ROTARY-PULSED UNIT (RPU).
80. A. N. Planovskiy, V. M. Ramm, S. Z. Kagan. THE PROCESSES AND UNITS OF CHEMICAL ENGINEERING. Moscow, Goskhimizdat, 1995.
81. V. P. Sevastyanov. Russian Patent RU 2433282. Nov. 10, 2011. A METHOD OF PSEUDO-DETONATIONAL GASIFICATION OF COAL SUSPENSION IN THE ICSGCC COMBINED CYCLE.
82. A. B. Lipilin. Russian Utility Model Patent RU 72155 U1. Apr. 10, 2008. WET GRINDING DISINTEGRATOR.
83. Y. A. Nikolayev, N. S. Shulayev, Y. V. Boyev, S. P. Ivanov, V. G. Afanasenko. Russian Patent RU 2414286. Mar. 20, 2011. AXIAL MIXER.
84. L. S. Skvortsov, B. P. Serdyuk, R. S. Grachova. Russian Patent RU 2438769. Jan. 10, 2012. A ROTOR HYDRODYNAMIC CAVITATION UNIT FOR LIQUID MEDIUM PROCESSING (OPTIONS).
85. V. N. Anikeyev, Y. N. Zhukov, S. A. Soloviov, Y. V. Motina, Y. M. Petrov. Russian Patent RU 2428246. Sep. 10, 2011. HYDROMECHANICAL PROCESSING ROTOR UNIT.
86. L. V. Kasimova. Russian Patent RU 2213452. Oct. 10, 2003. PLANT GROWTH STIMULANT.
87. M. V. Yefanov, V. A. Novozhonov, V. N. Frankivskiy. PEAT OXIDIZING AMMONOLYSIS UNDER CAVITATION PROCESSING. Plant Raw Material Chemistry, 2010. #1, pp. 165-169.
88. M. A. Konov, R. K. Khamizov. Russian Patent RU 2511296. Apr. 10, 2014. A METHOD OF OBTAINING COMPOSITE ORGANOMINERAL FERTILIZERS FOR SOIL APPLICATION AND FINISHED GROWING MEDIA.

The invention claimed is:

1. A method for continuously converting raw material comprising brown coals, including leonardite, into humic fertilizers and fuel briquettes,
wherein the humic fertilizers are selected from:
ballast organic fertilizers in the form of suspended gels, ballast organomineral fertilizers in the form of suspended gels, ballastless solutions of humic acid, ballastless solutions of fulvic acid, ballastless dry humic acid salts and ballastless dry fulvic acid salts;
wherein said method comprises
first grinding the raw material to less than 3 mm,
subjecting the ground raw material to two consecutive first and second liquid-phase mechanoactivation and/or mechanochemical activation treatments in a first mechanochemical reactor and a second mechanochemical reactor, respectively,
wherein the first liquid-phase mechanoactivation and/or mechanochemical activation treatment in the first mechanochemical reactor comprises either liquid-phase oxidation with hydrogen peroxide or treatment with water and the second liquid-phase mechanoactivation and/or mechanochemical activation treatment in the second mechanochemical reactor comprises aqueous alkaline treatment; and
wherein the first and second mechanoactivation and/or mechanochemical activation treatments are performed with dispersion of a medium being converted inside the first and second mechanochemical reactors by chafing and dynamic shift of layers of the medium by exposing the medium to hydraulic impulse with frequencies ranging in the sonic and infrasonic frequencies, by metered introduction into the medium of 10 to 40 MJ per cubic meter of mechanical energy, with automatic limitation of the energy in a sub-cavitation area for preventing the first and second mechanochemical reactors from falling into cavitation modes;
the method further comprising mechanical phase division of converted suspension compositions into solid and liquid phases in a centrifugal force field, optionally acidizing the liquid phase with a withdrawal of humic acids from the liquid phase to a heavy phase, and recycling of residual water.

2. The method according to claim 1 wherein flows of compositions being converted are redirected, thus organizing process loops for manufacturing the humic fertilizers.

3. The method according to claim 1, wherein during the conversion of the raw material into the humic fertilizers and fuel briquettes, mineral fertilizers and/or micronutrients are added.

4. The method according to claim 1, wherein to accelerate the process of withdrawal of humic acids from the liquid phase to the heavy phase in the form of coagulated pulp, which is manifested in agglomeration, flocculants are used.

5. The method according to claim 1, wherein during preparation of fulvic preparations, the liquid phase is acidified to pH values in the range 1.5 to 2.5 with a withdrawal of humic acids from the liquid phase to the heavy phase in the form of coagulated pulp while fulvic acid remain dissolved in the liquid phase and gravitational division by density is used.

6. The method according to claim 1, wherein the obtained fulvic acid solution is filtered to remove particles larger than 40 μm.

7. The method according to claim 1, wherein humic acid solutions and/or fulvic acid solutions obtained are concentrated by vacuum evaporation at 60° C., and before evaporation, the solutions are subjected to activation by applying high-pressure.

8. The method according to claim 1, wherein the recycling of residual water comprises processes of desalination of said residual water, which are solutions products of alkali and acid neutralization with a separation of salts.

9. The method according to claim 1, wherein during the treatments, volatile substances contained in the raw material component are discharged and the combustible part of the volatile substances is used for heat generation to be used in processes requiring heating.

10. The method according to claim 1, wherein an anti-foaming agent is introduced into a medium being converted.

11. The method according to claim 1, wherein the fuel briquettes being produced are used for process heat generation.

* * * * *